US011523027B2

(12) United States Patent
Nakajima

(10) Patent No.: US 11,523,027 B2
(45) Date of Patent: Dec. 6, 2022

(54) IMAGE READING APPARATUS

(71) Applicant: CANON KABUSHIKI KAISHA, Tokyo (JP)

(72) Inventor: Fumika Nakajima, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/553,242

(22) Filed: Dec. 16, 2021

(65) Prior Publication Data

US 2022/0201155 A1 Jun. 23, 2022

(30) Foreign Application Priority Data

Dec. 22, 2020 (JP) .............................. JP2020-212652

(51) Int. Cl.
*H04N 1/04* (2006.01)
*H04N 1/387* (2006.01)
*H04N 1/00* (2006.01)

(52) U.S. Cl.
CPC ......... *H04N 1/3878* (2013.01); *H04N 1/0057* (2013.01); *H04N 1/00721* (2013.01); *H04N 1/00737* (2013.01); *H04N 1/00745* (2013.01); *H04N 1/00798* (2013.01)

(58) Field of Classification Search
None
See application file for complete search history.

(56) References Cited

U.S. PATENT DOCUMENTS

| | | | | |
|---|---|---|---|---|
| 2011/0141504 A1* | 6/2011 | Utsunomiya | ........ | H04N 1/2032 358/1.9 |
| 2017/0126929 A1* | 5/2017 | Noro | .................. | H04N 1/00809 |
| 2018/0048786 A1* | 2/2018 | Sunada | .............. | H04N 1/00779 |
| 2018/0124268 A1* | 5/2018 | Satsuka | ................ | H04N 1/2104 |
| 2019/0079445 A1* | 3/2019 | Wakabayashi | ..... | G03G 15/6567 |
| 2019/0238703 A1* | 8/2019 | Seki | ...................... | H04N 1/3878 |
| 2021/0144273 A1* | 5/2021 | Nakayoshi | ......... | H04N 1/00748 |

FOREIGN PATENT DOCUMENTS

JP 2016-158162 9/2016

* cited by examiner

*Primary Examiner* — Dung D Tran
(74) *Attorney, Agent, or Firm* — Venable LLP

(57) ABSTRACT

An image reading apparatus includes a conveyor configured to convey an original in a conveyance direction; a reader configured to read an image of the original conveyed by the conveyor; and at least one processor configured to: determine, based on the image read by the reader, an inclination amount corresponding to an inclination angle of a side of a leading edge of the original in the conveyance direction, wherein the inclination angle represents an inclination of the side of the leading edge of the original with respect to a width direction orthogonal to the conveyance direction; rotationally correct the image read by the reader by the inclination amount so as to reduce the inclination amount to output a first image in which the rotationally corrected image is included in a case where the inclination amount is smaller than a predetermined amount.

6 Claims, 19 Drawing Sheets

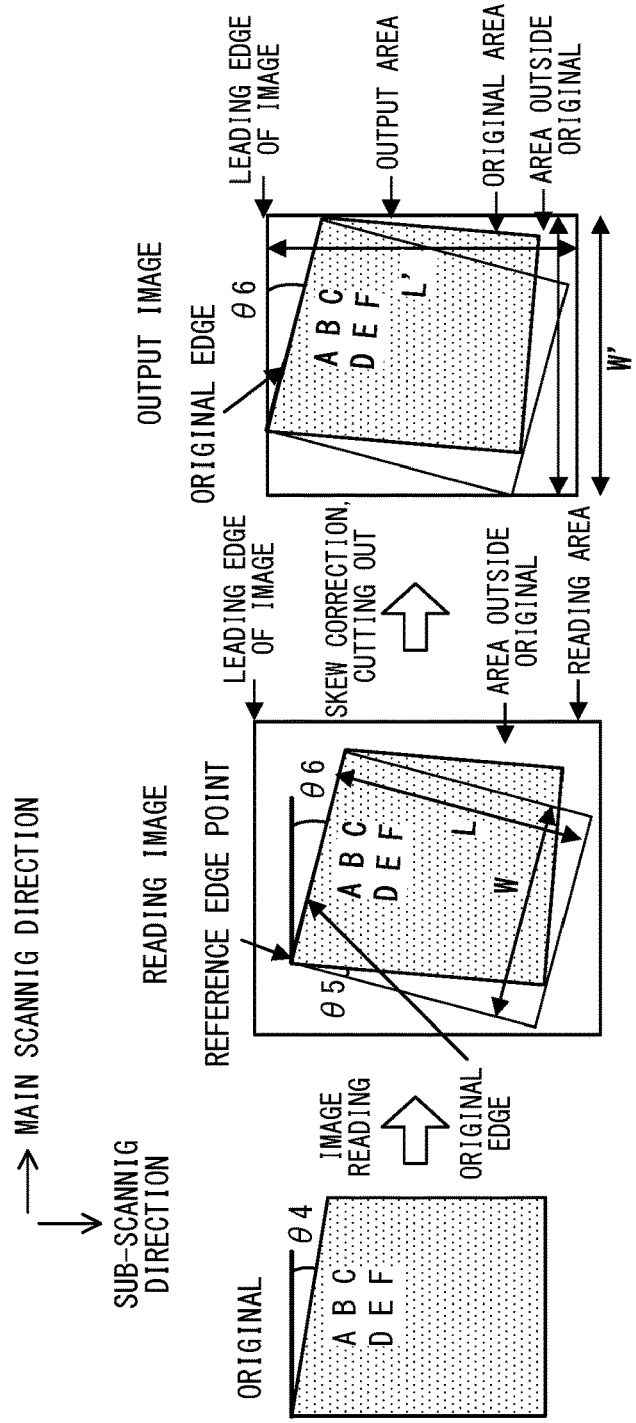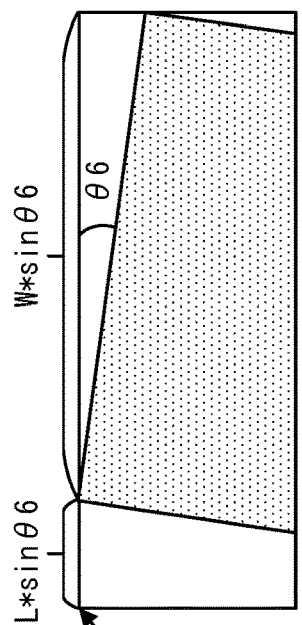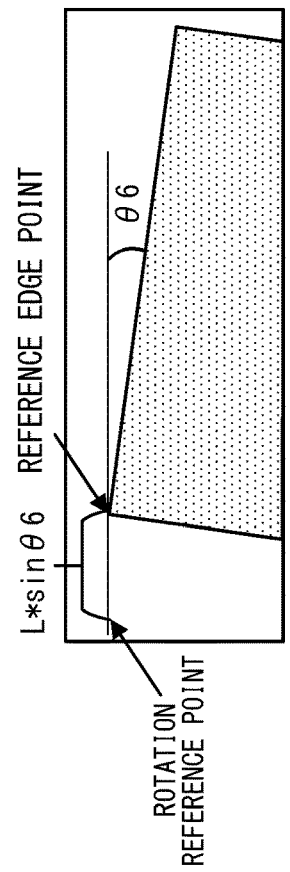
FIG. 8A
FIG. 8B
FIG. 8C

IMAGE READING APPARATUS

BACKGROUND OF THE INVENTION

Field of the Invention

The present disclosure relates to an image reading apparatus to read an image of an original (original image).

Description of the Related Art

A copier, a multifunction apparatus, and the like include an image forming apparatus and an image reading apparatus such as a scanner that optically reads the original image from the original. The image forming apparatus forms an image on a sheet-shaped recording paper based on image data generated by the image reading apparatus by reading the original image. The image reading apparatus can read the original image placed on the platen. In addition, the image reading apparatus may include an Auto Document Feeder (hereinafter referred to as "ADF"). The ADF has a feeding tray and conveys the original placed on the feeding tray one by one to a reading position of the image reading apparatus. The image reading apparatus reads the original image from the original conveyed by the ADF. By placing a plurality of the originals on the feeding tray, the image reading apparatus can continuously read the original images from the plurality of the originals. When reading the original image while conveying the original using the ADF, the original may be skewed due to assembly accuracy of the ADF and/or a manufacturing error of the roller that conveys the original, and the like. This causes an inclination in the original image included in a read image (reading image) Further, in a case where the original is placed on the feeding tray of the ADF in an inclined state, the original image in the reading image may be inclined.

In a case where the original image in the reading image is inclined, an inclination amount of the original image is calculated from the reading image, and the inclination of the original image is corrected by image processing based on the inclination amount. Therefore, the reading image includes the original image and is obtained by reading an area wider than the size of the original. By correcting the inclination of the original image in the reading image and trimming an image from the reading image to the original size after the inclination correction, a reading result (output image) of the original image is not inclined and without missing portion.

In the inclination correction by image processing, generally, a maximum correction angle, which indicates a limit of the inclination amount which can be corrected, is set because of reasons such as the capacity of the memory used for the correction and avoiding deterioration of the image quality due to the image processing. The maximum correction angle is set to be larger than a skew amount during conveying, which can occur in the original, having a rectangular shape, normally placed on the feeding tray of the ADF. Therefore, from the original having a rectangular shape normally placed on the feeding tray of the ADF, an output image which is not inclined and has no missing portion can be obtained. In a case where the inclination amount of the original image in the reading image exceeds the maximum correction angle, in the output image, a portion of the original image lacks when the inclination correction is performed. In Japanese Patent Application Laid-open No. 2016-158162, in a case where the inclination amount of the original image in the reading image exceeds the maximum correction angle, by correcting the inclination to the maximum correction angle and trimming an image to a size which is one size or one step larger than the size of the original, the occurrence of missing image at an edge of the original is prevented.

As described in Japanese Patent Application Laid-open No. 2016-158162, it is possible to prevent missing an image at the edge of the original by trimming the image to a size larger than the original size. However, in this case, the output image includes a large area outside of the original image. In a case where the output image includes an image of the area outside of the original image, the amount of data of the output image becomes larger as compared to the output image which does not include the image of the outer area. This leads to an increase in storage capacity, data transfer time, or processing time required for image processing, which is not preferable for the user. Therefore, the present disclosure provides an image reading apparatus in which a read original image can be output with a smaller amount of data.

SUMMARY OF THE INVENTION

An image reading apparatus according to the present disclosure includes: a conveyor configured to convey an original in a conveyance direction; a reader configured to read an image of the original conveyed by the conveyor; and at least one processor configured to: determine, based on the image read by the reader, an inclination amount corresponding to an inclination angle of a side of a leading edge of the original in the conveyance direction, wherein the inclination angle represents an inclination of the side of the leading edge of the original with respect to a width direction orthogonal to the conveyance direction; rotationally correct the image read by the reader by the inclination amount so as to reduce the inclination amount to output a first image in which the rotationally corrected image is included in a case where the inclination amount is smaller than a predetermined amount, wherein the size of the first image is a smallest size among standard sizes in which the rotationally corrected image is included; and rotationally correct the image read by the reader by the predetermined amount so as to reduce the inclination amount to output a second image in which the rotationally corrected image is included in a case where the inclination amount is larger than a predetermined amount, wherein the size of the second image is smaller than a minimum size among standard sizes in which the rotationally corrected image is included and larger or equal to a size of a rectangle circumscribing the rotationally corrected image.

Further features of the present invention will become apparent from the following description of exemplary embodiments (with reference to the attached drawings).

BRIEF DESCRIPTION OF THE DRAWINGS

FIG. 8A, FIG. 8B, and FIG. 8C are explanatory diagrams of processes for extracting the original image from the reading image.

DESCRIPTION OF THE EMBODIMENTS

Hereinafter, embodiments for carrying out the present invention will be described with reference to the drawings.

First Embodiment

Figure 1:
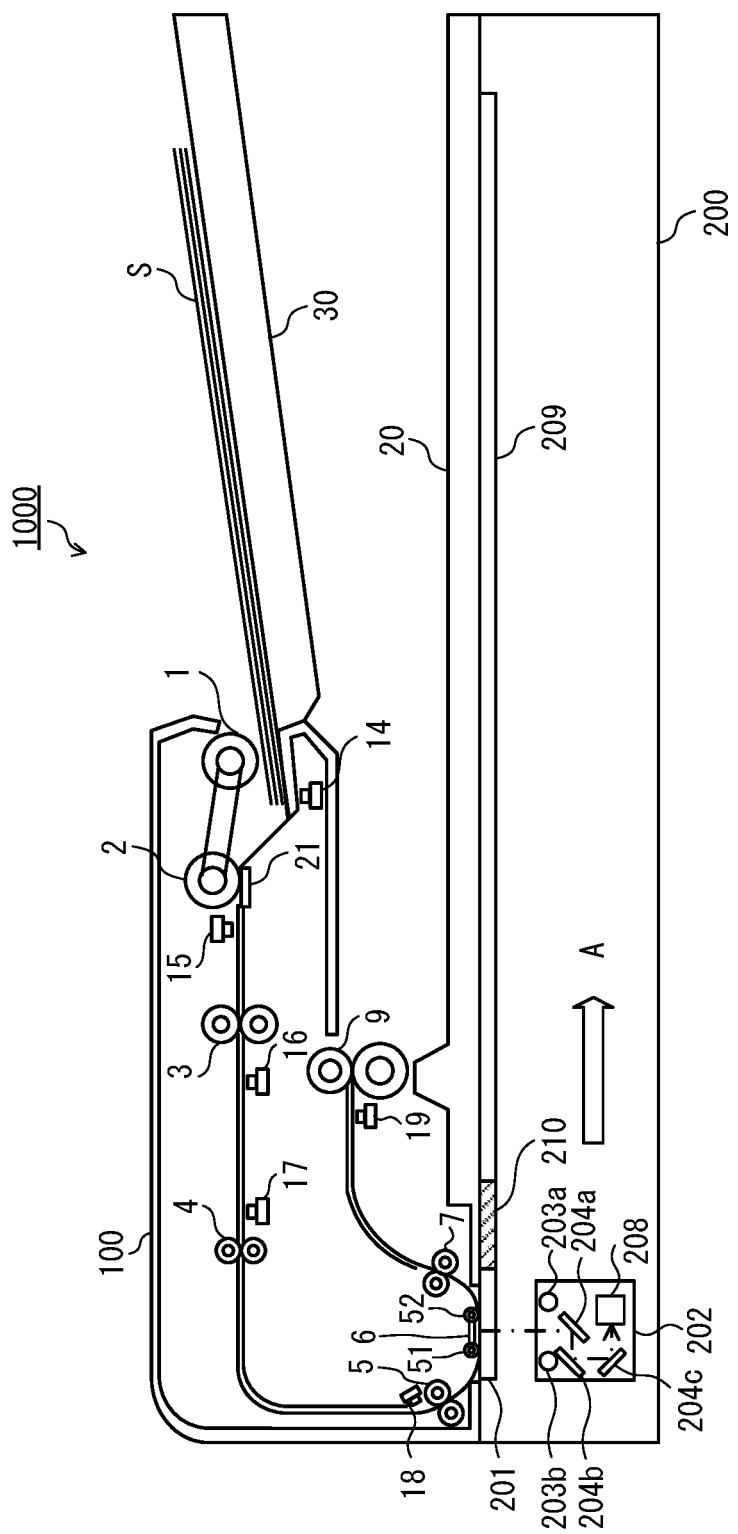
FIG. 1 is a configuration diagram of an image reading apparatus.

FIG. 1 is a configuration diagram of an image reading apparatus of the present embodiment. The image reading apparatus 1000 has an image reading unit (hereinafter, referred to as "reader") 200 for reading an original image from an original, and an ADF 100. The ADF 100 is an original conveyance device which conveys the original to a reading position of the original image by the reader 200. The image reading apparatus 1000 generates image data representing the original image read from the original.

The ADF 100 includes a feeding tray 30 on which an original bundle S, which is a bundle of one or more original, is stacked. On a downstream side of the feeding tray 30 in a conveyance direction, a sheet feeding roller 1, a separation pad 21 a separation roller 2 are provided. The separation pad 21 regulates the original bundle S to prevent it from protruding from the feeding tray 30 and advancing to the downstream side before starting conveyance. On the downstream side of the separation roller 2, a drawing roller 3, conveyance rollers 4 and 5, a reading upstream roller 51, a reading downstream roller 52, a conveyance roller 7, and a discharge roller 9 are arranged, along a sheet conveyance path, in this order from the upstream side. A position between the reading upstream roller 51 and the reading downstream roller 52 corresponds to a reading position of the original image by the reader 200. At the reading position, a glass facing member 6 is provided on the ADF 100 side, and a flow reading glass plate 201 is provided on the reader 200 side.

The feeding tray 30 has an original presence/absence detection sensor 14 at its proximal end portion. It is possible to decide presence or absence of the original on the feeding tray by the original presence/absence detection sensor 14. The sheet feeding roller 1 falls, at the time of feeding the original, on an original surface of the original bundle S stacked on the feeding tray 30 and rotates. As a result, at least the original at the uppermost surface of the original bundle S is fed. From the original(s) fed by the sheet feeding roller 1, one sheet is separated by action of the separation roller 2 and the separation pad 21. This separation of the original is realized by a known separation technique.

The original separated by the separation roller 2 and the separation pad 21 is sequentially conveyed by the drawing roller 3, the conveyance roller 4, and the conveyance roller 5 along the sheet conveyance path. The original conveyed by the conveyance roller 5 is conveyed, between the glass facing member 6 and the flow reading glass plate 201, by the reading upstream roller 51 to the reading downstream roller 52. The original image is read while the original is conveyed between the glass facing member 6 and the flow reading glass plate 201. The original conveyed to the reading downstream roller 52 passes through the conveyance roller 7 and the discharge roller 9 in this order and is discharged on a discharge tray 20. When there are a plurality of originals on the feeding tray 30, the ADF 100 repeatedly feeds the originals until the original image of the last original is read and the last original is discharged to the discharge tray 20.

In the sheet conveyance path, the original detection sensors 15, 16, 17, 18, and 19 are arranged in this order from the upstream side in the conveyance direction of the original. The original detection sensors 15, 16, 17, 18, and 19 each detect the original conveyed along the sheet control path, respectively. The timing of feeding, separating, conveying, reading, and discharging the original is controlled based on the timing at which the original detection sensors 15, 16, 17, 18, and 19 detect the original. For example, a reading start timing of the original image by the reader 200 is controlled based on the timing at which the original detection sensor 18 detects a leading edge of the original and a distance from the original detection sensor 18 to the reading position. The original detection sensors 15, 16, 17, 18, and 19 are arranged at the center of the sheet conveyance path in a direction (width direction) orthogonal to the original conveyance direction so that the originals of various sizes can be detected.

The reader 200 includes a reading unit 202 in its housing and includes the flow reading glass plate 201, a shading white plate 210, and a platen 209 at the ADF 100 side of the housing. The reading unit 202 includes light sources 203a, 203b, a plurality of mirrors 204a, 204b, and 204c, and a reading sensor 208. For example, a light emitting element such as an LED (Light Emitting Diode) can be used as the light sources 203a and 203b.

The light sources 203a and 203b irradiate, via the flow reading glass plate 201, the original passing between the glass facing member 6 and the flow reading glass plate 201 with light. The irradiated light is reflected by the original. The light reflected by the original is reflected by the mirrors 204a, 204b, and 204c and read by the reading sensor 208. The reading sensor 208 is configured by arranging a plurality of light receiving elements in a straight line. The plurality of light receiving elements are arranged in a direction orthogonal to the conveyance direction of the original. The direction in which a plurality of light receiving elements are arranged is a main scanning direction. The conveyance direction of the original is a sub-scanning direction. The reading sensor 208 reads the original image one line at a time in the main scanning direction.

The shading white plate 210 is a white member which serves as a reference when performing shading correction of the reader 200. The shading white plate 210 is read by the reading unit 202 before reading the original image. Based on a reading result of the shading white plate 210 by the reading unit 202, reference data of white level by shading is generated.

On the platen 209, the original is placed so that the surface on which the image is formed faces a housing side (platen 209 side) of the reader 200. The reading unit 202 irradiates the original placed on the platen 209 with light by the light sources 203a and 203b while moving in the direction of an arrow A to receive the reflected light by the reading sensor 208. Thereby the reading unit 202 can read the original image of the original placed on the platen 209 line by line.

When reading the original image of the original conveyed by the ADF 100, the reading unit 202 performs a reading operation directly under the flow reading glass plate 201 without moving. When reading the original image from the original placed on the platen 209, the reading unit 202 performs the reading operation while moving in the direction of arrow A. The direction of arrow A is the same as the conveyance direction of the original, and is also the same as the sub-scanning direction. The reading process of reading the original image while conveying the original by the ADF 100 is referred to as "flow reading". Further, the reading process of reading the original image from the original placed on the platen 209 is referred to as "fixed reading".

In the flow reading, in addition to an inclination correction method of the original image in the reading image by the image processing described later, a method of mechanically correcting skew of the original in the conveyance process of the same is known. In the present embodiment, the skew of the original is not mechanically corrected, rather, the original image in the reading image is corrected only by inclination correction by image processing. However, the method of mechanically correcting the skew of the original and the inclination correction by image processing may be used together. For example, the method of mechanically correcting the skew of the original is performed as follows.

When conveying the original to the conveyance roller 4 by the drawing roller 3, the conveyance roller 4 is stopped. The leading edge of the original is abutted to the stopped conveyance roller 4 by the drawing roller 3. As the rotation of the drawing roller 3 further progresses, a loop is formed on a leading edge side of the original. By stopping the drawing roller 3 at the timing when the required amount of loop is formed and then rotating the conveyance roller 4, the original is conveyed in a state in which the skew is cured.

Figure 2:
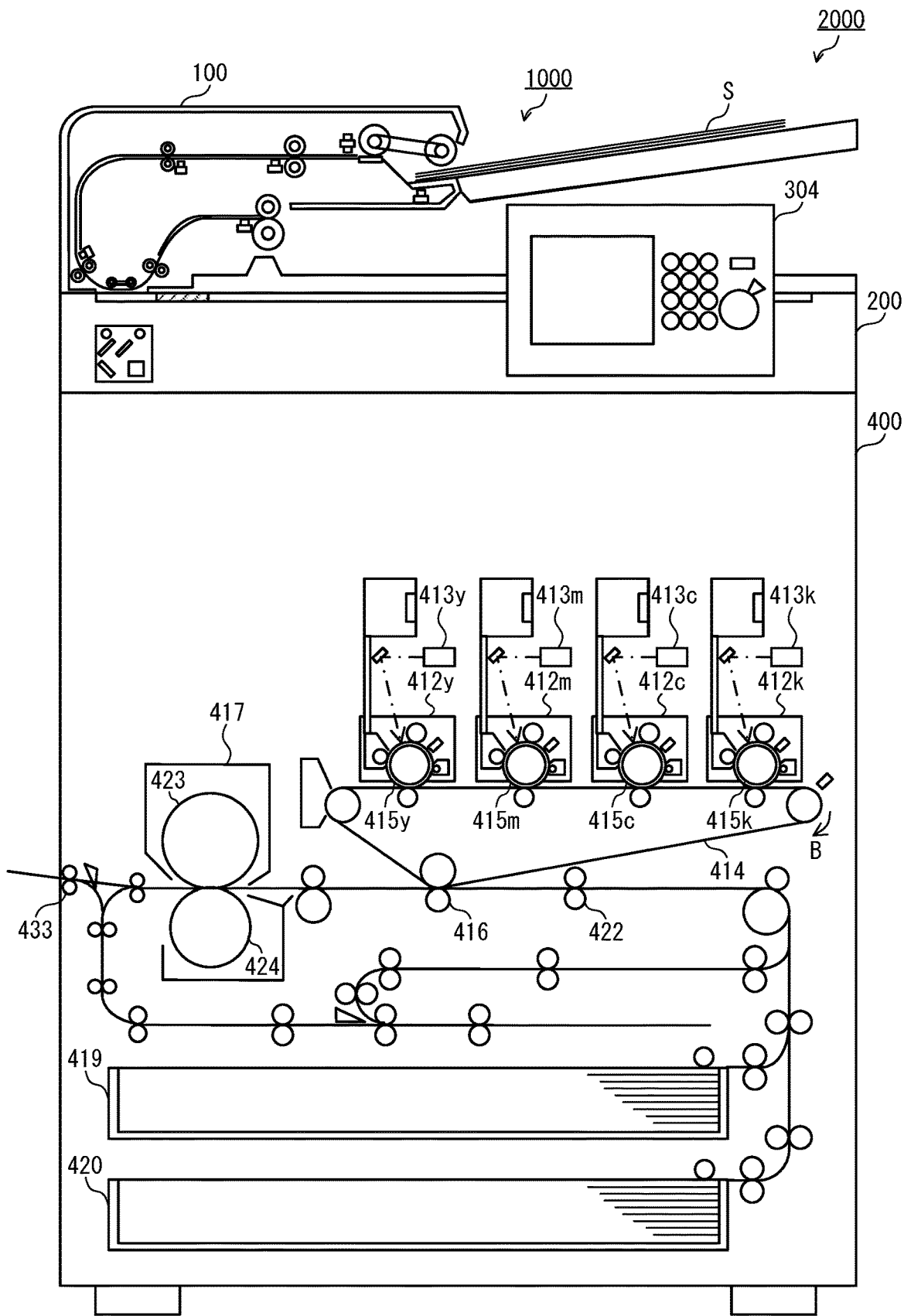
FIG. 2 is a configuration diagram of an image forming apparatus.

FIG. 2 is a configuration diagram of the image forming apparatus to which the image reading apparatus 1000 of FIG. 1 is attached. The image forming apparatus 2000 includes the above-mentioned image reading apparatus 1000, a printer 400, and an operation unit 304. The image forming apparatus 2000 of the present embodiment has a print function, a copy function, a scanner function, and the like. The image forming apparatus 2000 forms, at the time of executing the copy function, an image on a recording paper by the printer 400 based on image data representing the original image of the original read by the image reading apparatus 1000. When executing the print function, the image forming apparatus 2000 forms an image on the recording paper by the printer 400 based on the image data obtained from an external device such as a personal computer. At the time of executing the scanner function, the image forming apparatus 2000 transmits the image data representing the original image of the original read by the image reading apparatus 1000 to an external device such as a personal computer, a smartphone, or a cloud. Alternatively, the image forming apparatus 2000 stores the image data in the storage device installed in the image reading apparatus 1000.

The operation unit 304 is a user interface having an input interface and an output interface. The input interface is a key button or a touch panel, and the like. The output interface is a display, a speaker, and the like.

The printer 400 forms a color image on the recording paper. Therefore, the printer 400 includes a plurality of image forming unit 412y, 412m, 412c, 412k, a plurality of exposure devices 413y, 413m, 413c, 413k, an intermediate transfer belt 414, a secondary transfer unit 416, and a fixing device 417. The printer 400 includes paper feed cassettes 419 and 420 in which the recording paper is accommodated. The paper feed cassette 419 and the paper feed cassette 420 may store recording papers of the same type. Further, the paper feed cassette 419 and the paper feed cassette 420 may store recording papers of different types and/or different sizes.

The image forming unit 412y is used to form a yellow (y) image. The image forming unit 412y has a photosensitive drum 415y, which is a drum-shaped photosensitive member. The image forming unit 412m is used to form an image of magenta (m). The image forming unit 412m has a photosensitive drum 415m, which is a drum-shaped photosensitive member. The image forming unit 412c is used to form an image of cyan (c). The image forming unit 412c has a photosensitive drum 415c, which is a drum-shaped photosensitive member. The image forming unit 412k is used to form a black (k) image. The image forming unit 412k has a photosensitive drum 415k, which is a drum-shaped photosensitive member. On the photosensitive drum 415y, 415m, 415c, and 415k, toner images of corresponding colors are formed on the respective surfaces in each charging step, exposing step, and development step.

The exposure devices 413y, 413m, 413c, and 413k are provided corresponding to the image forming units 412y, 412m, 412c, and 412k. The exposure device 413y irradiates the photosensitive drum 415y, which rotates around its drum axis, with a laser beam modulated based on image data representing the yellow image. The photosensitive drum 415y is scanned by the laser beam along the drum axis direction, with its surface uniformly charged, to thereby form an electrostatic latent image. The exposure device 413m irradiates the photosensitive drum 415m, which rotates around its drum axis, with a laser beam modulated based on image data representing the magenta image. The photosensitive drum 415m is scanned by the laser beam along the drum axis direction, with its surface uniformly charged, to thereby form an electrostatic latent image. The exposure device 413c irradiates the photosensitive drum 415c, which rotates around its drum axis, with a laser beam modulated based on image data representing the cyan image. The photosensitive drum 415c is scanned by the laser beam along the drum axis direction, with its surface uniformly charged, to thereby form an electrostatic latent image. The exposure device 413k irradiates the photosensitive drum 415k, which rotates around its drum axis, with a laser beam modulated based on image data representing the black image. The photosensitive drum 415k is scanned by the laser beam along the drum axis direction, with its surface uniformly charged, to thereby form an electrostatic latent image.

As to the photosensitive drum 415y on which the electrostatic latent image is formed, the electrostatic latent image is developed by a yellow developer to thereby form a toner image of yellow on its surface. As to the photosensitive drum 415m on which the electrostatic latent image is formed, the electrostatic latent image is developed by a magenta developer to thereby form a toner image of magenta on its surface. As to the photosensitive drum 415c on which the electrostatic latent image is formed, the electrostatic latent image is developed by a cyan developer to thereby form a toner image of magenta on its surface. As to the photosensitive drum 415k on which the electrostatic latent image is formed, the electrostatic latent image is developed by a black developer to thereby form a toner image of black on its surface.

The toner image formed in each of the photosensitive drums 415y, 415m, 415c, and 415k is transferred so as to be superimposed on the intermediate transfer belt 414. The intermediate transfer belt 414 rotates in a direction of arrow B at a predetermined speed, and the toner image is transferred from each of the photosensitive drums 415y, 415m, 415c, and 415k at each timing. By superimposingly transferring the toner images, a full-color toner image is formed on the intermediate transfer belt 414. The intermediate transfer belt 414 rotates to transfer the toner image supported on the same to the secondary transfer unit 416.

The registration roller 422 is provided along the sheet conveyance path of the recording paper between the paper feed cassettes 419 and 420 and the secondary transfer unit 416. The recording paper is fed from the paper feed cassettes 419 and 420 to the registration roller 422. The registration roller 422 is in a stopped state at the timing when the conveyed recording paper P reaches. An edge side of the printing media P collides with a nip portion of the registration roller 422 to form a loop on the leading edge side. The registration roller 422 conveys the recording paper to the secondary transfer unit 416 at the timing when the intermediate transfer belt 414 transfers the toner image to the secondary transfer unit 416. The secondary transfer unit 416 transfers the toner image of the intermediate transfer belt 414 to the recording paper. The recording paper on which the toner image is transferred is conveyed to the fixing device 417.

The fixing device 417 has a fixing roller 423 in which a heater is installed and a pressing roller 424. In the fixing device 417, the recording paper, on which the toner image is transferred, is sandwiched between the fixing roller 423 and the pressing roller 424 and conveyed. At this time, the toner image is thermocompression bonded to the recording paper by the fixing roller 423 and the pressing roller 424. An image is formed on the recording paper in this way. The recording paper on which the image is formed is discharged to the outside of the machine by the discharge roller 433.

Control system

Figure 3:
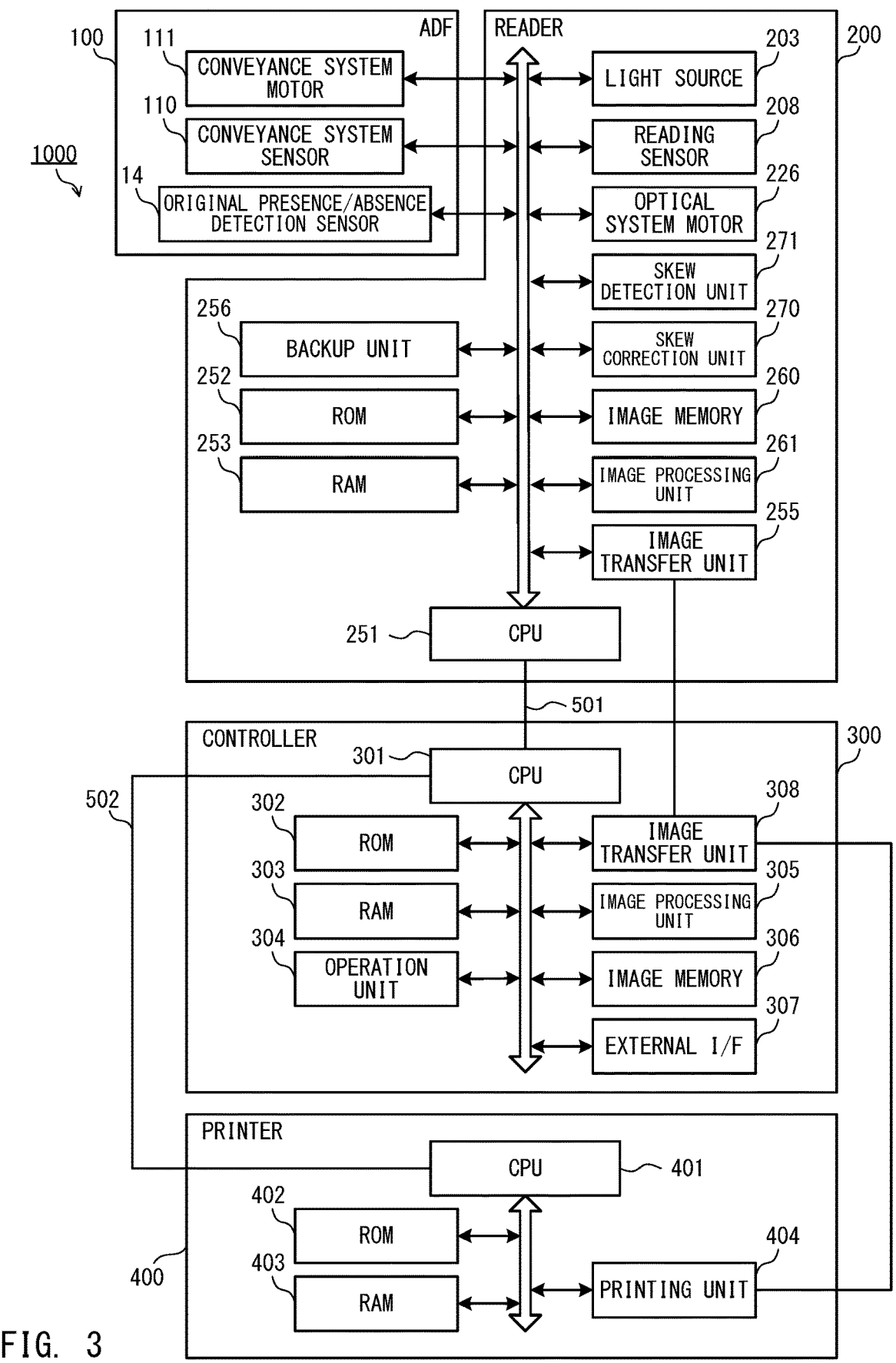
FIG. 3 is a configuration diagram of a control system.

FIG. 3 is a configuration diagram of a control system which controls the operation of the image forming apparatus 2000. The control system is distributed across the reader 200 and the printer 400. The control system has a controller 300. The controller 300 controls an overall operation of the image forming apparatus 2000. The controller 300 is provided, for example, in a housing of the printer 400.

The reader 200 includes a CPU (Central Processing Unit) 251, a ROM (Read Only Memory) 252, and a RAM (Random Access Memory) 253. The CPU 251 controls the operation of the image reading apparatus 1000 (reader 200 and ADF 100) by executing a computer program stored in the ROM 252. The RAM 253 provides a work area when the CPU 251 executes a process. The CPU 251 is communicably connected to the controller 300 via communication line 501 and controls the operation of the image reading apparatus 1000 in response to an instruction from the controller 300.

In order to realize the image reading function, the light source 203 (203a, 203b), the reading sensor 208, an optical system motor 226, an image memory 260, an image processing unit 261, and an image transfer unit 255 are connected to the CPU 251 via a bus. The optical system motor 226 is a drive source for moving the reading unit 202 (the light source 203 and the reading sensor 208) in the direction of arrow A in FIG. 1. The image memory 260 is a storage device that temporarily stores image data representing the reading image output from the reading sensor 208. The image processing unit 261 performs an image process on the read data (the reading image) stored in the image memory 260 as necessary. The image transfer unit 255 transfers the image data to the controller 300.

In order to realize an original conveyance function, a conveyance system motor 111 for driving various rollers provided along the sheet conveyance path is connected to the CPU 251 via the bus. Various conveyance system sensors 110 (the original detection sensors 15, 16, 17, 18, and 19) provided along the sheet conveyance path are connected to the CPU 251 via the bus. The original presence/absence detection sensor 14 for detecting presence/absence of the original on the feeding tray 30 is connected to the CPU 251 via the bus. The conveyance system motor 111 is controlled by drive pulses output from the CPU 251. The conveyance system motor 111 is a drive source for various rollers provided along the sheet conveyance path. The conveyance system motor 111 is one or more motors, and each motor rotationally drives one or more rollers. The CPU 251 can measure the number of output drive pulses, and can manage a conveyance distance of the original. The conveyance system motor 111, the conveyance system sensor 110, and the original presence/absence detection sensor 14 are provided in the ADF 100.

A backup unit 256 is connected to the CPU 251 via the bus. The backup unit 256 is a storage device for storing a part of work data used for controlling the reader 200 and the ADF 100, a set value which is set for each machine, and the like.

Further, in order to realize skew correction of the original image read by the reading sensor 208, a skew detection unit 271 and a skew correction unit 270 are connected to the CPU 251 via the bus. Details of the skew detection function performed by the skew detection unit 271, a skew correction function performed by the skew correction unit 270, and an original cutting function will be described later.

The printer 400 includes a CPU 401, a ROM 402, a RAM 403, and a printing unit 404. The CPU 401 controls the operation of the printer 400 by executing a computer program stored in the ROM 402. The RAM 403 provides a work area which is used when the CPU 401 executes a process. The printing unit 404 controls the operation of each unit in the printer 400 under the control of the CPU 401 to form an image on the recording paper. The CPU 401 is communicably connected to the controller 300 via the communication line 502, and controls an operation of the printer 400 in response to an instruction from the controller 300.

The controller 300 is connected to the reader 200 and the printer 400, and sends instructions to each of the reader 200 and the printer 400 to control their operations. The controller 300 includes a CPU 301, a ROM 302, and a RAM 303. The CPU 301 controls the operation of the image forming apparatus 2000 (the image reading apparatus 1000 and the printer 400) by executing a computer program stored in the ROM 302. The RAM 303 provides a work area which is used when the CPU 301 executes a process. The operation unit 304, an image transfer unit 308, an image processing unit 305, an image memory 306, and an external interface (I/F) 307 are connected to the CPU 301 via the bus.

The image transfer unit 308 receives the image data from the image transfer unit 255 of the reader 200, and stores the received image data in the image memory 306. As to the scanner function, the image transfer unit 308 transmits the image data stored in the image memory 306 to an external device such as a computer via the external I/F 307. In a case of the copy function, the image transfer unit 308 transfers the image data stored in the image memory 306 to the printing unit 404. The image processing unit 305 performs an image process on the image data stored in the image memory 306 as necessary.

The CPU 301 receives an operation instruction for the image forming apparatus 2000 from the operation unit 304. In addition, the CPU 301 displays a message to a user, a read image, a setting screen for providing an operation instruction to the image forming apparatus 2000, and the like via the operation unit 304. The CPU 301 transmits and receives control commands and control data related to an image reading control to the CPU 251 of the reader 200 via the communication line 501. For example, the CPU 301 receives an image reading start instruction from the operation unit 304 and transmits an image reading start request to the CPU 251. Further, for example, the CPU 301 obtains an abnormality occurrence notification from the CPU 251 and controls the operation unit 304 to display a message according to a type of abnormality. The CPU 301 is connected to the CPU 401 of the printer 400 via a communication line 502, and is configured to transmit and receive a control command and control data related to an image forming control to and from the CPU 401. For example, the CPU 301 receives an image forming start instruction from the operation unit 304 and transmits an image forming start request to the CPU 401.

The operation control of the image reading apparatus 1000 by the control system having the above configuration will be described.

During an operation of the image reading apparatus 1000, the CPU 251 of the reader 200 monitors a detection result of the original presence/absence detection sensor 14. Each time the detection result changes, the CPU 251 notifies the CPU 301 of the controller 300 of the detection result of the original presence/absence detection sensor 14 via the communication line 501. The CPU 301 can determine whether or not an original bundle S is stacked on the feeding tray 30 based on the detection result of the notified original presence/absence detection sensor 14.

When the CPU 301 receives the image reading start instruction from the operation unit 304, it transmits an image reading start request to the CPU 251 via the communication line 501. The reader 200 starts reading the original in response to the image reading start request from the CPU 301. The image reading start request is either "fixed reading start request" or "flow reading start request". The "fixed reading start request" is a request for starting fixed reading. The "flow reading start request" is a request for starting flow reading. In a case where the original bundle S is not stacked on the feeding tray 30 at the time when the original reading start instruction is received from the operation unit 304, the CPU 301 transmits "fixed reading start request" to the CPU 251. In a case where the original bundle S is stacked on the feeding tray 30 at the time when the original reading start instruction is received from the operation unit 304, the CPU 301 transmits "flow reading start request" to the CPU 251. The reader 200 starts either the fixed reading or the flow reading depending on whether the image reading start request from the CPU 301 is a "fixed reading start request" or "flow reading start request".

In the present embodiment, there are two types of jobs controlled by the controller 300, a copy job and a scan job. In the copy job, the image reading apparatus 1000 reads the original image from the original by the fixed reading or the flow reading, and the printer 400 prints the reading result of the original image by the image reading apparatus 1000 on the recording paper. In the scan job, the image reading apparatus 1000 reads the original image from the original by the fixed reading or the flow reading, and sends the reading result to a destination (external device) previously designated by the user via the external I/F 307.

In the scan job of the present embodiment, the reading result is transmitted via the external I/F 307, however, the present disclosure is not limited to this configuration. For example, in the case of the scan job, the controller 300 may be provided with a storage device for storing an image, and the image data representing the read image may be stored in the storage device.

The CPU 301 receives an operation instruction from the operation unit 304. The operation instruction from the operation unit 304 includes a copy job start instruction and a scan job start instruction. The operation instruction includes an image reading start instruction. The CPU 301, after receiving the operation instruction, transmits the image reading start request to the CPU 251 via the communication line 501. The CPU 251 obtains the image reading start request and starts the image reading process.

In the case of a copy job, the image data, which is the reading result of the original image, is stored in the image memory 306 via the image transfer unit 255 and the image transfer unit 308, and then transferred to the printing unit 404 by the image transfer unit 308. The printing unit 404 forms an image on the recording paper by the method described above based on the obtained image data. When the image forming for all image data has been completed, the CPU 301 ends the copy job.

In the case of the scan job, the image data which is the reading result of the original image is stored in the image memory 306 via the image transfer unit 255 and the image transfer unit 308, and then sent to the image transmission destination via the external I/F 307. When transmission for all image data is completed, the CPU 301 ends the scan job.

Inclination Correction

Figure 4:
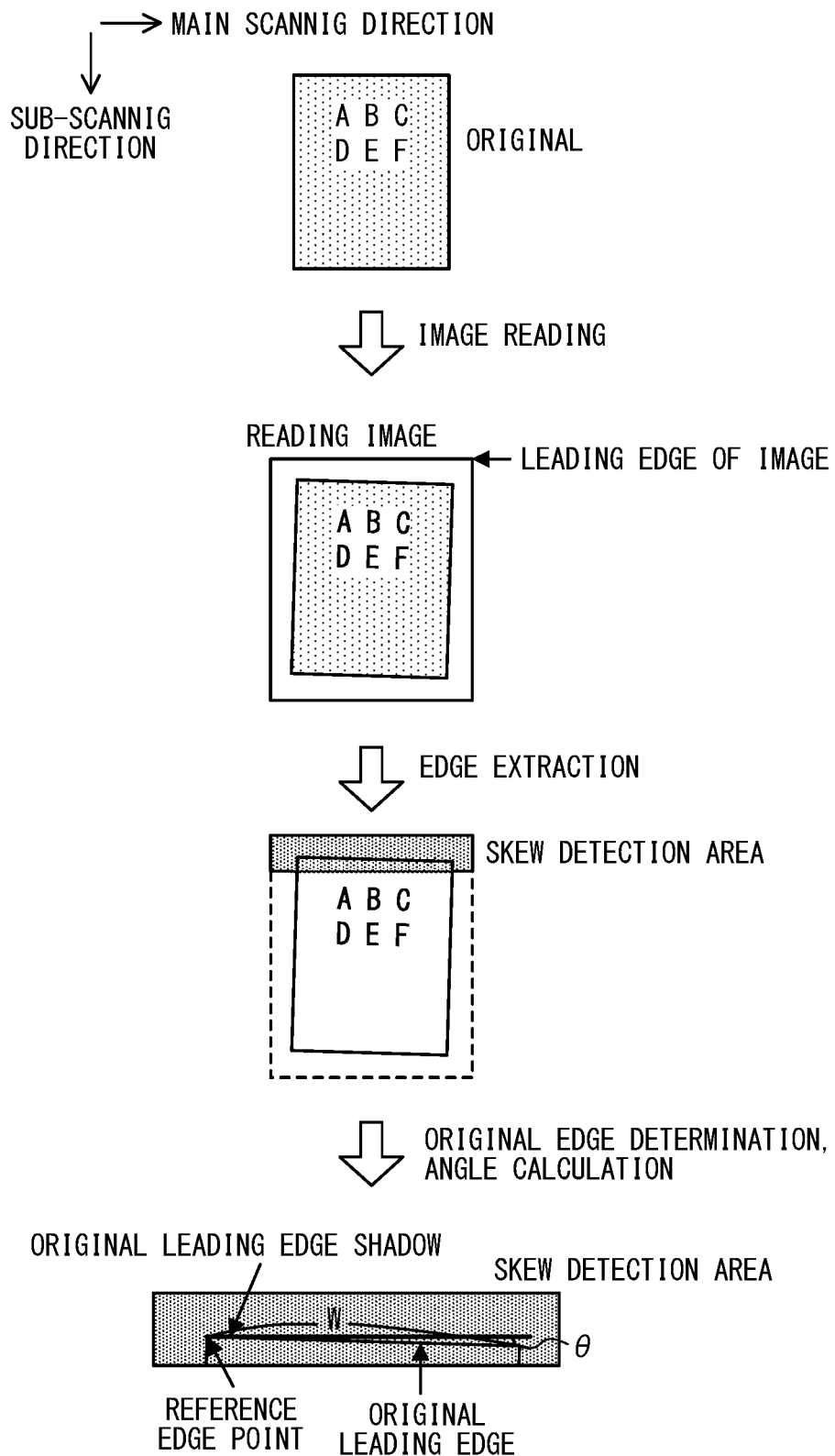
FIG. 4 is an explanatory diagram of an inclination correction of an original image in the reading image.

FIG. 4 is an explanatory diagram of an inclination correction of the original image in the reading image. The original image read by the image reading apparatus 1000 from the original is output from the reading sensor 208 as the reading image. FIG. 4 represents the reading image when the original image is read by flow reading. In the case of flow reading, the reading image is a result of reading an area larger than whether the original size since the original may be skewed. Specifically, the reading area is expanded and set so that the entire original can be read even when the original is skewed up to the upper limit of an amount allowed for the image reading apparatus 1000.

The length (main scanning width) of the main scanning direction in the reading area is fixed at a maximum width which can be read by the reading sensor 208. The length (sub-scanning length) of the sub-scanning direction in the reading area is determined by adjusting a reading start timing and a reading end timing. The reading start timing is adjusted to be earlier than the timing at which the leading edge of the original reaches the reading position. The reading end timing is adjusted to be later than the timing at which the trailing edge of the original passes through the reading position. Specifically, the reading start timing is set before the timing at which the original leading edge reaches the reading position, based on the timing when the original detection sensor 18 detects the leading edge of the original and a distance from the detection position to the reading position of the original detection sensor 18. Also the trailing edge of the original, the reading end timing is set at the timing after the trailing edge of the original is detected by the original detection sensor 18 and then the rear and of the original reaches the reading position. By setting the reading start timing and the reading end timing in this way, the reading image having an area larger than the size of the original, including the original image, can be obtained.

The skew detection unit 271 detects skew based on the reading image. The skew detection unit 271 first extracts an edge of the original from the original image in the reading image. When reading the original, a shadow is generated outside the edge of the original due to the thickness of the original. The skew detection unit 271 uses this shadow to extract the edge of the original in a skew detection area is performed. The skew detection unit 271 extracts a shadow portion as an edge from the reading image. The skew detection unit 271 detects the edge of the original on the leading edge side of the original from a portion where the edge is continuously extracted, and determines a skew amount of the original (an inclination amount of the original image) based on the edge of the original at the leading edge. The skew amount of the original is the inclination angle of the original with respect to the main scanning direction.

The skew detection unit 271 also calculates the coordinates of the left leading edge vertex and the right leading edge vertex of the original from the edge. A coordinate of a predetermined vertex, for example, a coordinate of the left leading edge vertex (hereinafter, referred to as "reference edge point") serves as a reference for a rotation process at the time of skew correction (inclination correction of the original image) described later. Further, the skew detection unit 271 calculates a leading edge width W of the original image from the coordinates of two vertices (the left leading edge vertex and the right leading edge vertex) arranged in the main scanning direction. In the present embodiment, the skew amount is calculated from the original leading edge, however, the skew amount may be calculated from another edge, for example, the side edge of the original image.

Figure 5:
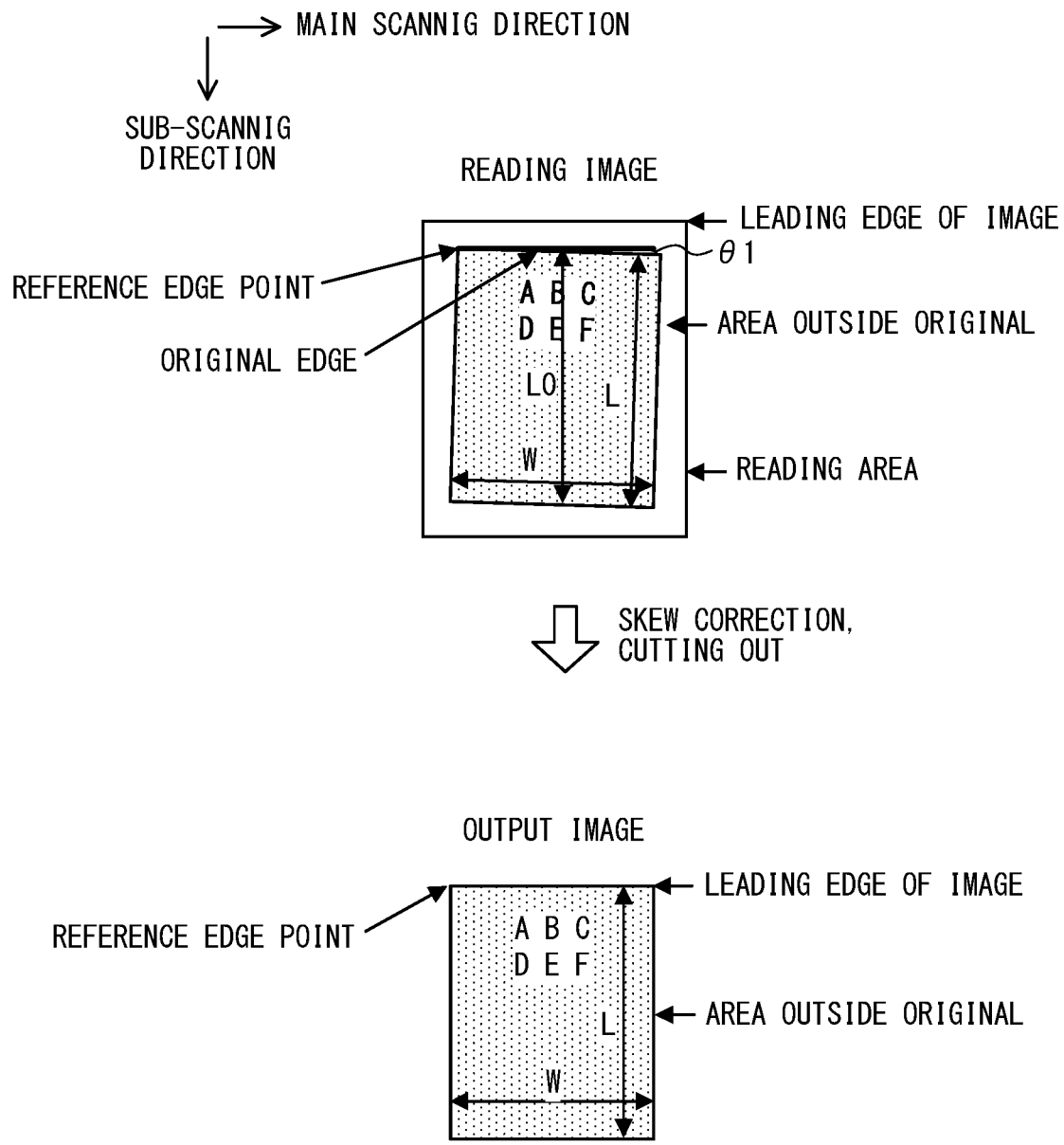
FIG. 5 is an explanatory diagram of a process for extracting the original image from the reading image.

FIG. 5 is an explanatory diagram of a process of extracting the original image from the reading image. In order to extract the original image, the inclination correction (skew correction) and cutting out of the original area (original cutting) are performed on the reading image. In FIG. 5, in the reading image output from the reading unit 202 (reading sensor 208), the original image is inclined downward to the right by an inclination amount (skew amount) $\theta 1$. The skew amount $\theta 1$ is an angle smaller than a predetermined amount. In the present embodiment, the predetermined amount is the maximum correction angle $\theta$MAX, which is the maximum angle that can be corrected by the skew correction unit 270. The output image is the original image extracted by performing the skew correction and the cutting out of the original on the reading image.

Based on an output main scanning width, an output sub-scanning length, the skew correction amount (angle), and a rotation reference point (coordinate), the skew correction unit 270 determines, for each pixel of the image data of the reading image, whether it is possible to output or not, and controls an order of output pixels. An output main scanning width is a width of the main scanning direction of the output image, and is equal to the leading edge width W of the original image in FIG. 5. An output sub-scanning length is a length in the sub-scanning direction of the output image, and in FIG. 5, it is equal to the length in the sub-scanning direction of the original image (sub-scanning length L). The skew correction amount is equal to the skew amount $\theta 1$. The rotation reference point is the reference edge point. Depending on whether the output is possible or not, the cutting out of an area of the original corresponding to the size of the original is performed. Pixels are rearranged by controlling the output order. By rearranging the pixels, the original image is rotated around the rotation reference point, and the skew (inclination) is corrected (reduced).

From the detection timing of the original leading edge and the detection timing of the original trailing edge by the original detection sensor 18, the CPU 251 obtains the conveyance distance (hereinafter, referred to as "the original length on the conveyance path") L0 between them. At this time, the sub-scanning length L of the original is calculated by the following formula based on the skew amount $\theta$ of the original.

$$L = L0 * \cos\theta \qquad \text{(Formula 1)}$$

Based on the leading edge width W of the original calculated by the skew detection unit 271 and the sub-scanning length L calculated by Formula 1, the CPU 251 set the output main scanning width and the output sub-scanning length in the skew correction unit 270. The CPU 251 sets, as the skew correction amount and the rotation reference point, the skew amount $\theta 1$ calculated by the skew detection unit 271 and the coordinates of the reference edge point in the skew correction unit 270.

The skew correction unit 270 performs the skew correction and the cutting out of the original by sequentially selecting and outputting the data of each pixel in the original image area. Based on the skew correction amount, the rotation reference point, the output main scanning width, and the output sub-scanning length set by CPU 251, the skew correction unit 270 selects and outputs pixel data, for example, by an affine transformation. In the image reading apparatus 1000 of the present embodiment, it is assumed that only a skew correction of 5° or less can be performed due to a limited memory capacity used for the affine transformation. That is, the maximum correction angle $\theta$MAX of the skew correction unit 270 is 5°.

In the affine transformation, pixel positions (the main scanning direction position X, the sub-scanning direction position Y) for correcting the skew amount $\theta$ is calculated. It is noted that x0 and y0 are movement amounts for parallel translation of the skew-corrected data so that the rotation reference point becomes the rotation center. It is noted that x0 and y0 are calculated from the coordinates of the rotation reference point and the skew correction amount. This makes it possible to match the output positions of the leading edge portion and the side edge of the image. The general formula of the affine transformation is represented by the following Formulas 2-1 and 2-2.

$$X = x\cos\theta - y\sin\theta + x0 \qquad \text{(Formula 2-1)}$$

$$Y = x\sin\theta + y\cos\theta + y0 \qquad \text{(Formula 2-2)}$$

X: Pixel position after correction of the main scanning direction

Y: Pixel position after correction of the sub-scanning direction x: Pixel position before correction of the main scanning direction y: Pixel position before correction of the sub-scanning direction x0: Amount of parallel translation of the main scanning direction (main scanning inclination correction reference position)

y0: Amount of parallel translation of the sub-scanning direction (secondary scanning inclination correction reference position)

θ: skew amount

Specifically, the output is started from the rotation reference point (X=0, Y=0), and the image data for one line after correction (the number of pixels based on the output main scanning width) is output by the affine transformation formula. After outputting the image data for one line, the image data for the next line is output. This is repeated for the number of lines according to the output sub-scan length.

The skew correction unit 270 performs the above process on the input image data to output the whole pixels of the original image to the controller 300 in order. The controller 300 generates the corrected output image shown in FIG. 5 by arranging the pixels in order for each line by the image transfer unit 308 which received the sent image data for each pixel. Since the image data of the pixels in an area outside of the original is not output, the output image is an image obtained by cutting out the area of the original image from the reading image. In the present embodiment, the skew correction is performed by rotating the image using the affine transformation, however, the skew correction may be performed by another method.

When the original is placed on the feeding tray 30 of the ADF 100 in an inclined state, the skew amount (inclination amount) which occurs in the original image in the reading image may exceed the maximum correction angle θMAX. At this time, in a case where the skew is corrected up to the maximum correction angle θMAX and then the image is cut out according to the size of the original, the image at the edge of the original may be missing.

Figure 6:
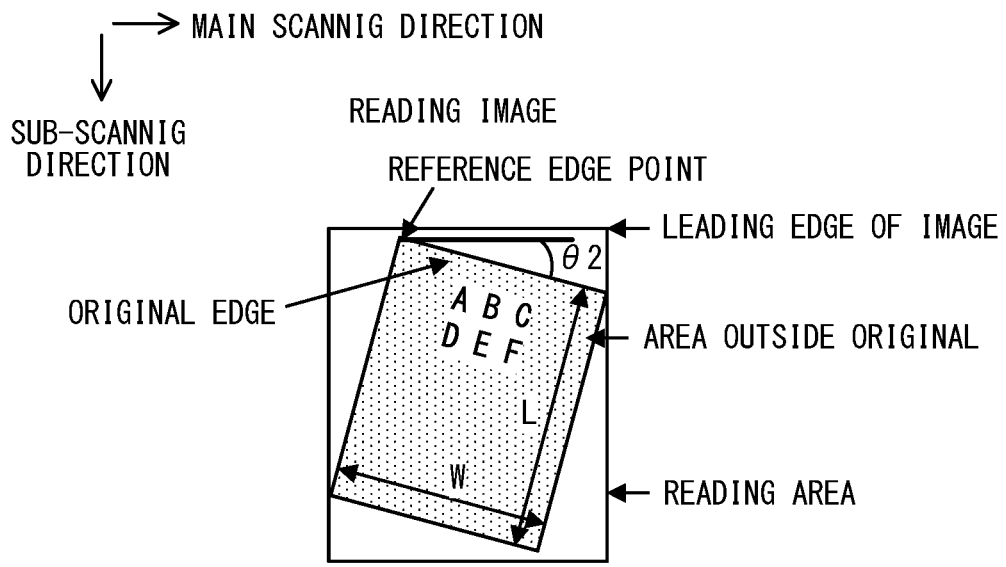
FIG. 6 is an explanatory diagram of a conventional process for extracting the original image from the reading image.
Figure 6:
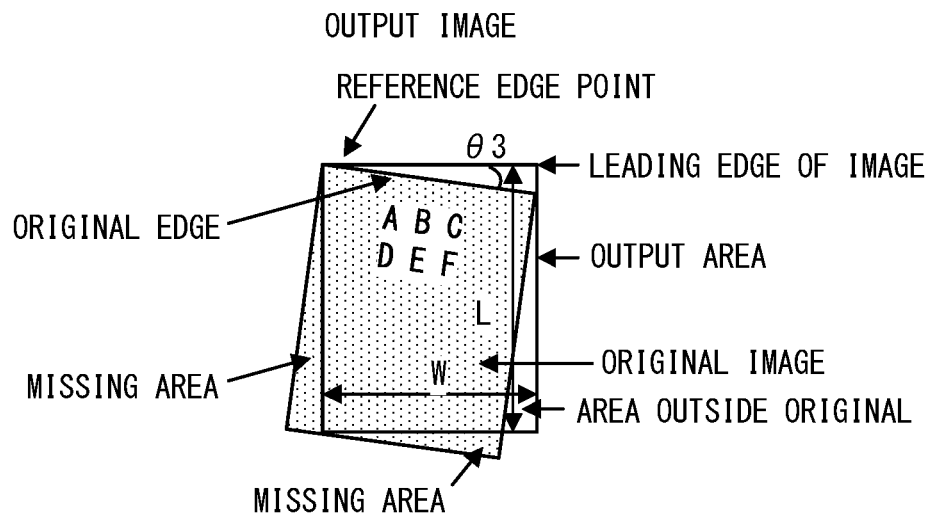

FIG. 6 is an explanatory diagram of the conventional process (skew correction and the cutting out of the original) in which the original image is extracted from the reading image in a case where the skew amount occurred in the reading image exceeds the maximum correction angle θMAX. With reference to FIG. 6, the lack of the image at the edge of the original in this case will be described.

The original image in the reading image is inclined by the skew amount θ2 with respect to the main scanning direction. The skew amount θ2 is larger than the maximum correction angle θMAX which can be corrected by the skew correction unit 270 (θ2>θMAX). Conventionally, for such the reading image, the skew correction and the cutting out of the original are performed in the same manner as the process described with reference to FIG. 5.

The CPU 251 sets the output main scanning width and the output sub-scanning length in the skew correction unit 270 based on the leading edge width W of the original calculated by skew detection and the sub-scanning length L calculated by the above Formula 1. Further, the CPU 251 sets the coordinates of the reference edge point calculated by the skew detection as the rotation reference point in the skew correction unit 270. Since the skew amount θ2 calculated by skew detection exceeds the maximum correction angle θMAX, the CPU 251 sets the maximum correction angle θMAX in the skew correction unit 270 as the skew correction amount. As a result, the original image of the output image is in a state in which the skew amount θ2 is reduced by the maximum correction angle θMAX, and the inclination still remains. That is, the skew amount θ3 of a remaining inclination is θ3=θ2−θMAX. Since the original image is cut out in a state in which the original is inclined by the skew amount θ3 with the main scanning width and the sub-scanning length of the original, the output image includes an area outside of the original. In addition, in the original image, a missing area which is not included in an output area occurs.

In order to minimize the area outside of the original included in the output image while preventing the occurrence of missing areas in the output image, in the present embodiment, in a case where the skew amount generated in the original image in the reading image exceeds the maximum correction angle θMAX, the skew correction and the cutting out of the original are performed as follows.

Figure 7A:
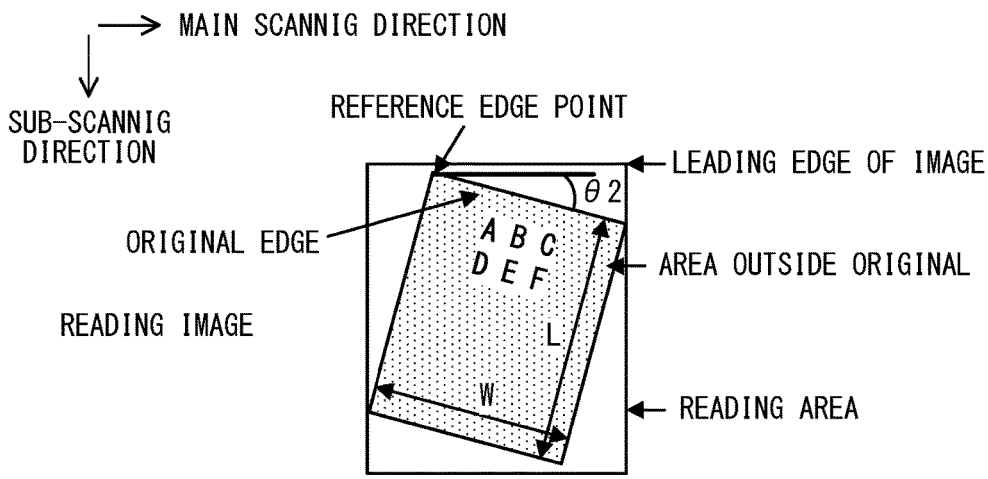
FIG. 7A, FIG. 7B, and FIG. 7C are explanatory diagrams of processes for extracting the original image from the reading image.
Figure 7B:
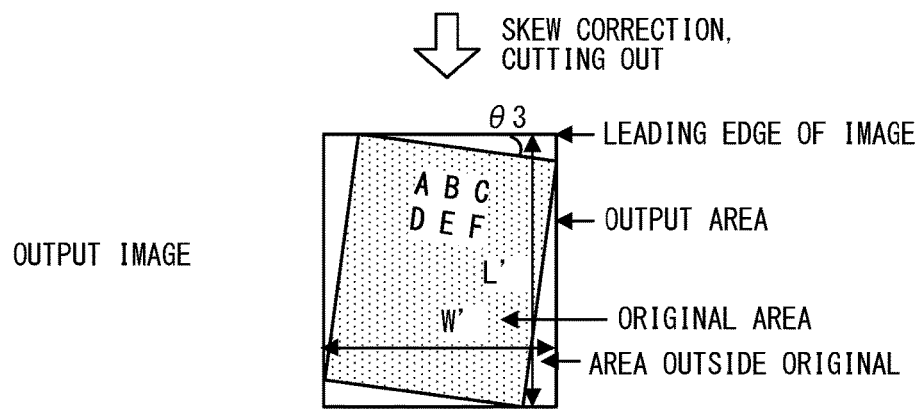
Figure 7B:
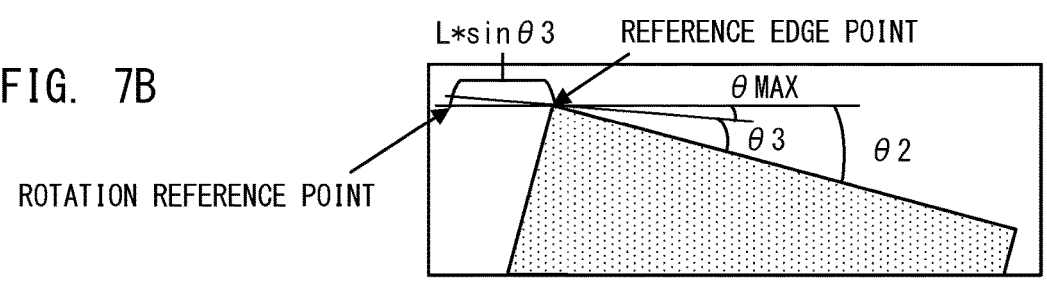
Figure 7C:
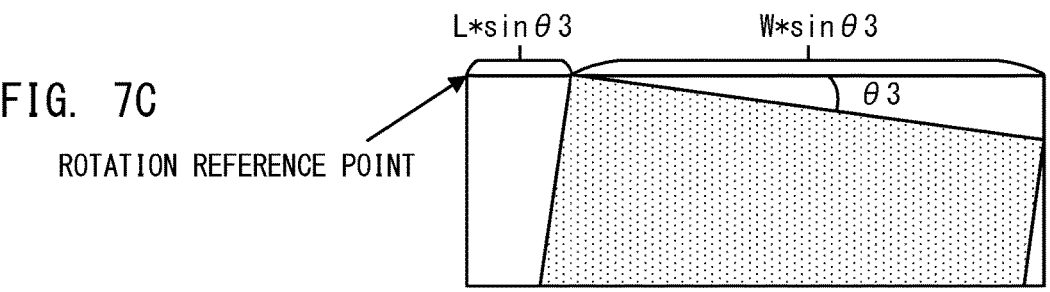

FIGS. 7A to 7C are explanatory views of a process (skew correction and cutting out of the original) for extracting the original image in which the skew amount exceeds the maximum correction angle θMAX from the reading image. Here, in a case where the skew amount of the original image in the reading image exceeds the maximum correction angle θMAX, the area outside of the original included in the output image is minimized while preventing the occurrence of the missing area of the original image in the output image.

As shown in FIG. 7A, the original image in the reading image is inclined by the skew amount θ2 (θ2>θMAX) with respect to the main scanning direction as in the case of the original image in the reading image in FIG. 6. By performing the skew correction and the cutting out of the original as in the conventional case, the skew amount θ3 remains in the original image of the output image as in the output image of FIG. 6. FIG. 7B is an enlarged view of the leading edge portion of the reading image. FIG. 7C is an enlarged view of the leading edge portion of the output image. At this time, the CPU 251 calculates the output main scanning width W' and the output sub-scanning length L' of the output image by the following Formulas 3-1 and 3-2 to set them in the skew correction unit 270.

$$W' = L \sin \theta' + W \cos \theta' \quad \text{(Formula 3-1)}$$

$$L' = W \sin \theta' + L \cos \theta' \quad \text{(Formula 3-2)}$$

W': output main scanning width

L': output sub-scanning length

W: width of the original leading edge calculated by skew detection

L: original sub-scanning length calculated by Formula 1

θ': skew amount in the original area in the output image

Here, the skew amount θ' in the original region in the output image is θ'=θ2−θMAX=θ3 in FIG. 7C.

Depending on presence or absence of the skew correction when the skew amount occurred in the original image of the reading image exceeds the maximum correction angle θMAX (hereinafter referred to as "presence or absence of the skew correction exceeding the maximum correction angle"), the skew amount θ' of the original image of the output image takes two values. Presence or absence of the skew correction exceeding the maximum correction angle may be set by the user using the operation unit 304. When performing the skew correction exceeding the maximum correction angle, since the image is rotated up to the maximum correction angle θMAX, the skew amount θ' of the original image of the output image is the remaining skew amount after the skew correction has been performed. In a case where the skew correction exceeding the maximum correction angle is not performed, the image is not rotated, therefore, the skew amount θ' of the original image of the output image is the skew amount calculated by the skew detection. FIG. 7C shows the former case, that is, the case of $\theta'=\theta 2-\theta MAX=\theta 3$. Details of the latter case will be described later.

The CPU 251 sets the skew correction amount $\theta'$ in the skew correction unit 270 according to presence or absence of skew correction exceeding the maximum correction angle. Therefore, in FIG. 7A, the skew correction amount $\theta 3$ is set in the skew correction unit 270. Further, the CPU 251 sets the rotation reference point in the skew correction unit 270. As shown in FIG. 7B, the rotation reference point is a point on a straight line which passes through the reference edge point and has the slope (inclination) of the skew amount $\theta 3$, and is separated from the reference edge point by a distance $L*\sin\theta 3$. When the skew correction and the cutting out of the original are performed based on the output main scanning width W', the output sub-scanning length L', the skew correction amount $\theta 3$, and the rotation reference point, in the output image, the original image is rotated up to the maximum correction angle $\theta MAX$. In addition, the area outside of the original included in the output image can be minimized while preventing the occurrence of the missing area of the original image in the output image. The output image is generated by cutting out the original image whose inclination has been corrected up to the maximum correction angle $\theta MAX$ with a size smaller than the minimum standard size among the standard sizes which can included the original image and larger than the size of a rectangle circumscribing the original image.

FIGS. 8A to 8C are explanatory views of a process (skew correction and cutting out of the original) for extracting the original image, which the leading edge is cut diagonally, from the reading image. The skew amount which occurred in the original image in the reading image exceeds the maximum correction angle $\theta MAX$. A description is made of a method in which, in a case where the skew amount of the original image occurred in the reading image exceeds the maximum correction angle $\theta MAX$, the area outside of the original included in the output image is minimized while preventing the occurrence of the missing area of the original image in the output image without performing the skew correction exceeding the maximum correction angle.

As shown in FIG. 8A, the leading edge is cut diagonally downward to the right by an angle $\theta 4$ with respect to the main scanning direction. When the original is read in a state of being inclined downward to the right by an angle $\theta 5$ with respect to the main scanning direction, the skew amount $\theta 6$ of the original image in the reading image is detected by the skew detection unit 271 as the skew amount $\theta 6=\theta 4+\theta 5$. It is assumed that the angle $\theta 4$ and the skew amount $\theta 6$ satisfy $\theta 4 \leq \theta MX$ and $\theta 6 > \theta MAX$ with respect to the maximum correction angle $\theta MAX$. The angle $\theta 4$ is equal to or less than the maximum correction angle $\theta MAX$ ($\theta 4 \leq \theta MX$), and the skew amount $\theta 6$ is an angle larger than the maximum correction angle $\theta MAX$ ($\theta 6 > \theta MAX$).

In the present embodiment, as described above, the skew amount is calculated based on the leading edge of the original. In the case of the original with the leading edge cut diagonally, in the original image in the reading image, the skew amount (the skew amount $\theta 6$) is larger than or equal to the skew amount ($\theta 5$) which has actually occurred in the original will be detected. Therefore, even if the skew amount occurred in the original image of the reading image exceeds the maximum correction angle $\theta MAX$, the skew amount of the actual original image may be less than the maximum correction angle $\theta MAX$. Therefore, in a case where the original image is rotated up to the maximum correction angle $\theta MAX$ since the skew amount occurred in the original image of the reading image exceeds the maximum correction angle $\theta MAX$, the original image may rotate more than or equal to the skew amount actually occurred in the original. Therefore, the user can set presence or absence of the skew correction exceeding the maximum correction angle. In a case where absence of the skew correction is set, only the cutting out of the original is performed without skew correction.

Figure 9:
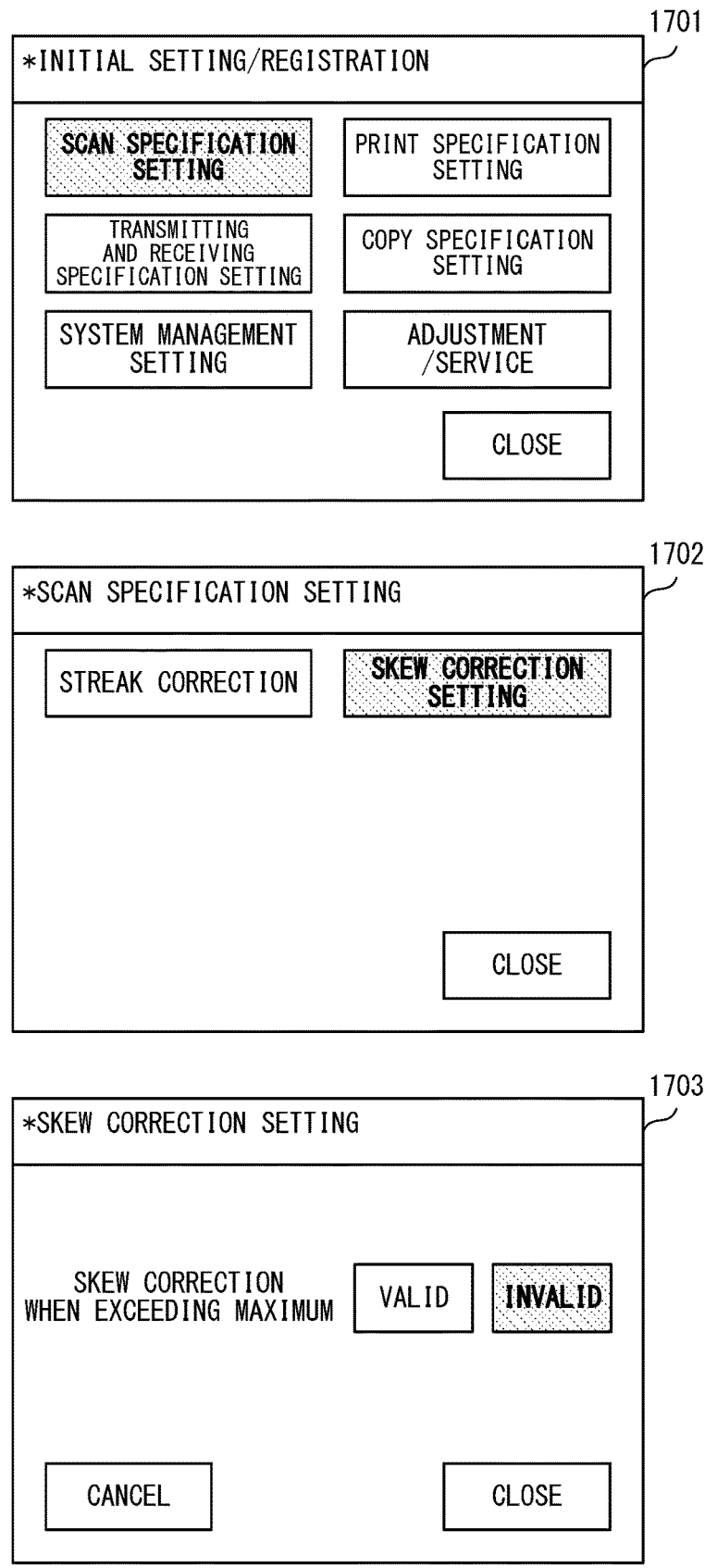
FIG. 9 is an exemplary diagram of a setting screen of presence or absence of skew correction exceeding the maximum correction angle.

FIG. 9 is an exemplary diagram of a setting screen for presence or absence of the skew correction exceeding the maximum correction angle. Each screen is displayed in the operation unit 304. The user sets presence or absence of the skew correction exceeding the maximum correction angle by the operation unit 304 according to the displayed screen.

The screen 1701 is a first screen of a setting registration screen for making various settings in the image forming apparatus 2000. When the "scan specification setting" button is selected in the screen 1701 by the operation unit 304 to perform a setting related to the image reading, the display of the operation unit 304 is switched to a scan specification setting screen 1702. In a case where "skew correction setting" button is selected in the scan specification setting screen 1702 by the operation unit 304, the display of the operation unit 304 is switched to a skew correction setting screen 1703 for setting the skew correction. In the skew correction setting screen 1703, it is possible to set whether or not to perform the skew correction exceeding the maximum correction angle described above. In a case where the original image, in which its leading edge is cut diagonally as shown in FIGS. 8A to 8C, is read, by setting "invalid" in the skew correction setting screen 1703, the skew correction is not performed and only the cutting out of the original is performed.

When reading the original image from the original in FIG. 8A, the CPU 251 calculates the output main scanning width W' and the output sub-scanning length L' using the above Formulas 3-1 and 3-2, and set them in the skew correction unit 270. However, the skew amount $\theta'$ of the original image of the output images in Formulas 3-1 and 3-2 is calculated as $\theta'=\theta 6$. Further, the CPU 251 sets the skew correction amount 0° (i.e., no skew correction) in the skew correction unit 270 according to the setting "absence" of the skew correction exceeding the maximum correction angle. The CPU 251 obtains the rotation reference point as follows and sets it in the skew correction unit 270. As shown in FIG. 8B, the rotation reference point is a point on a straight line which passes through the reference edge point and parallel to the leading edge of the image, and is separated from the reference edge point by a distance $L*\sin \theta 6$.

The skew correction and the cutting out of the original are performed based on the output main scanning width W', the output sub-scanning length L', the skew correction amount 0°, and the rotation reference point. As a result, as shown in the output images of FIG. 8A and FIG. 8C, the area outside of the original included in the output image can be minimized while preventing the occurrence of a missing area in the output image without rotating the image.

Figure 10:
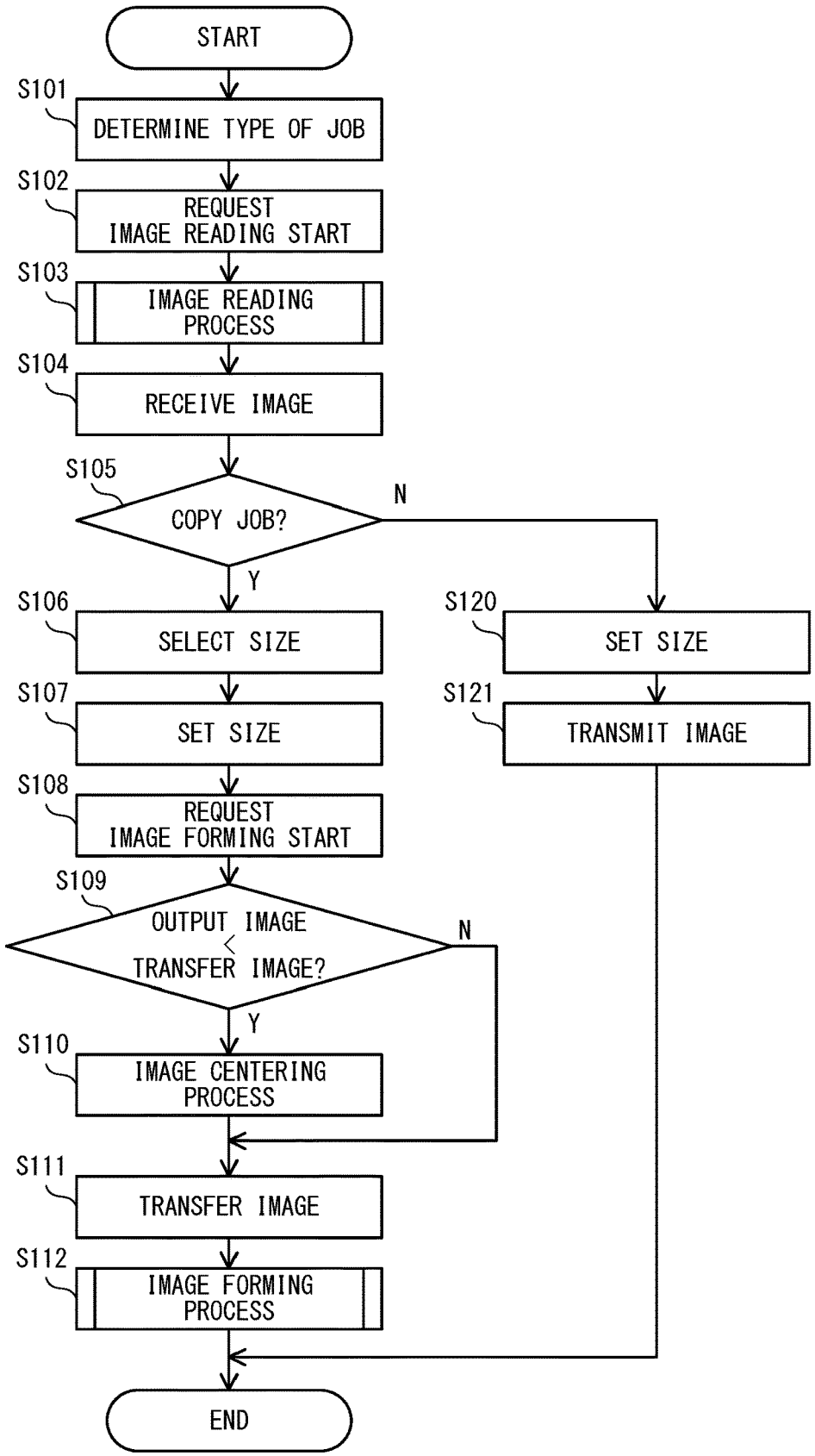
FIG. 10 is a flowchart representing a process corresponding to a job.

FIG. 10 is a flowchart representing a process according to the job by the image forming apparatus 2000. The image forming apparatus 2000 can perform copy jobs and scan jobs. In the copy job, the image reading apparatus 1000 reads the original image from the original and transmits the image data representing the read original image to the printer 400. The printer 400 can form an image on a recording paper based on the image data obtained from the image reading apparatus 1000 to thereby generate a recording paper on which the original image is copied. In the scan job, the image reading apparatus 1000 reads the original image from the original and transmits the image data representing the read original image to an external device. FIGS. 11A and 11B and FIGS. 12A and 12B are explanatory views of image states in the copy job and the scan job in the flow reading.

The CPU 301 receives a job start instruction (copy job start instruction or scan job start instruction) from the operation unit 304 to start the job. First, the CPU 301 determines the type of the job based on the job start instruction (Step S101). Here, the CPU 301 determines whether the instructed job is a copy job or a scan job. The CPU 301 transmits an image reading start request to the CPU 251 (Step S102). The image reading start request is either "fixed reading start request" or "flow reading start request", as described above. The CPU 251 performs an image reading process based on the image reading start request received from the CPU 301 (Step S103). The image data (output image) is transferred from the reader 200 by the image reading process. The CPU 301 receives the image data of the output image by the image transfer unit 308 and stores it in the image memory 306 (Step S104). The CPU 301 determines whether the job type is a copy job or not (Step S105).

Figure 11A:
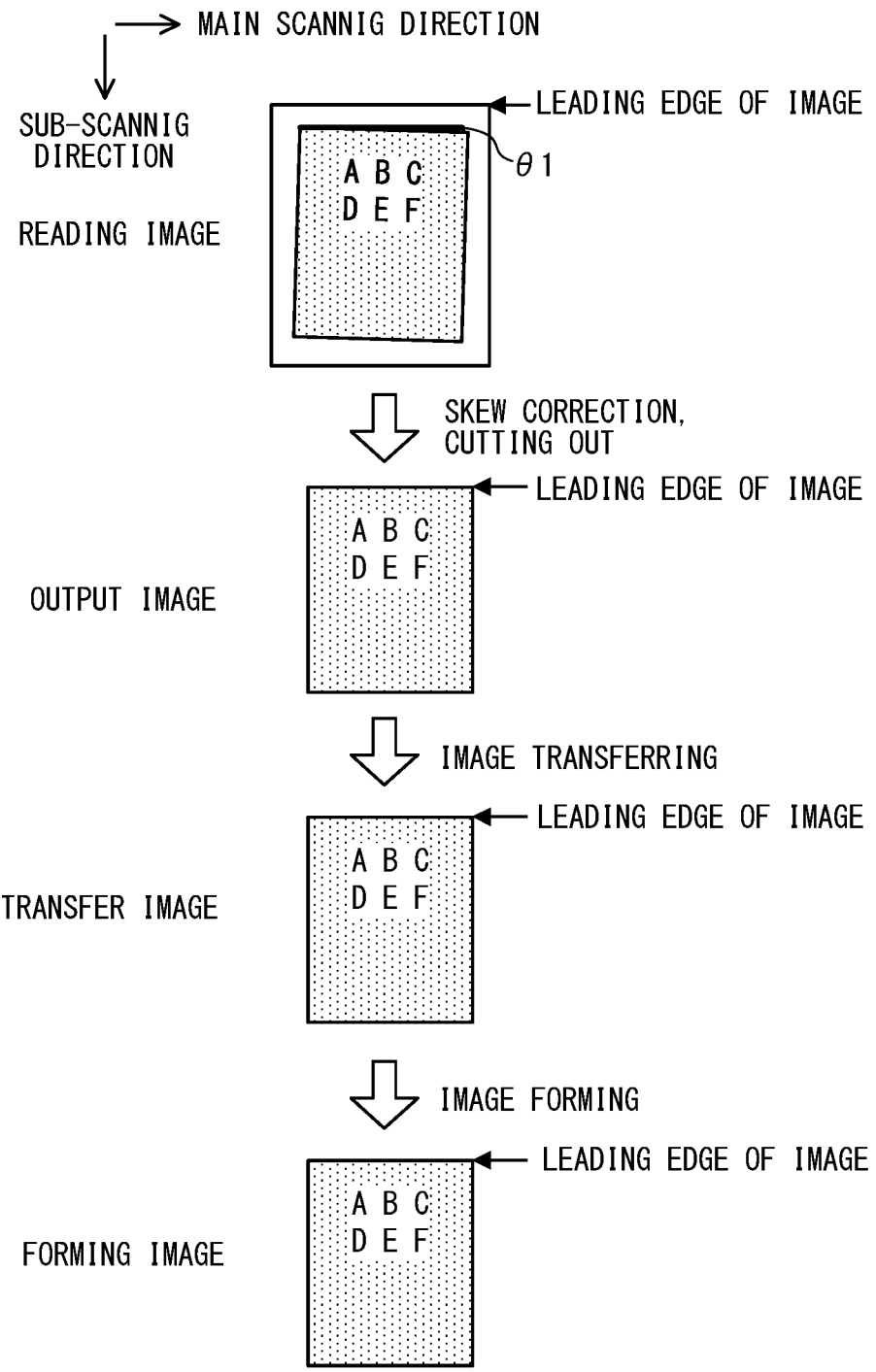
FIG. 11A and FIG. 11B are explanatory diagrams of image states in a copy job.
Figure 11B:
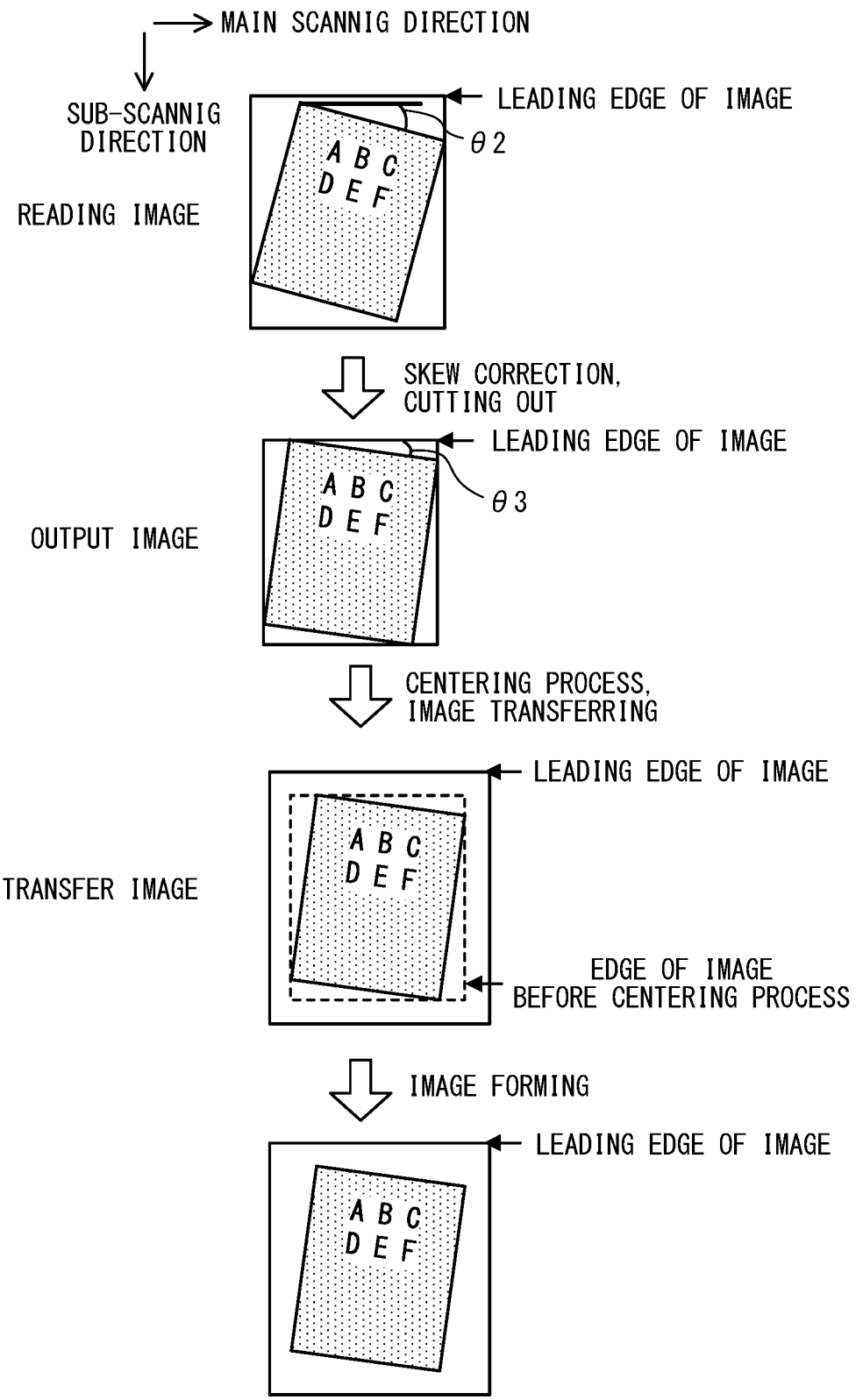

Each of FIGS. 11A and 11B represents an image state at respective processing time in the copy job in the flow reading. FIG. 11A represents a state in which the original is skewed by the skew amount θ1. FIG. 11B represents a state in which the original is skewed by the skew amount θ2. As described with reference to FIG. 5, the angle of the skew amount θ1 is smaller than that of the maximum correction angle θMAX. As described with reference to FIG. 7A, the angle of the skew amount θ2 is larger than that of the maximum correction angle θMAX.

The reader 200 performs the skew correction and the cutting out of the original on the original image in the reading image, and outputs the image data of the output image. The controller 300 performs transfer image size setting and centering processing as necessary, which will be described later, on the image data of the output image obtained from the reader 200. The controller 300 transmits the image data of the processed image (transfer image) to the printer 400. The printer 400 forms an image (formed image) on the recording paper based on the image data of the transfer image obtained from the controller 300.

When the job type is the copy job (Step S105: Y), the CPU 301 selects the minimum standard size in which the output image can be formed as the recording paper size according to the size of the output image obtained in the process of S104 (Step S106). For example, when the original is B5R size, the inclination of the original is corrected by the skew correction, and the original image is cut out by the cutting out of the original so that the output image becomes B5R size, as shown in FIG. 11A. Since the minimum standard size in which B5R size image can be formed is B5R, B5R is selected as the recording paper size. As shown in FIG. 11B, in a case where the cutting out of the original is performed in a state in which the inclination still remains by the skew correction and the cutting out of the original, the output image becomes larger than the B5R size. In this case, for example, as the minimum standard size in which the output image can be formed, A4R is selected as the recording paper size.

The CPU 301 sets the selected recording paper size as the size of the image (transfer image) to be transferred to the printer 400 (Step S107). The CPU 301 transmits the image forming start request to the printer 400 (Step S108). As a result, the size of the output image becomes less than or equal to the size of the transfer image. The CPU 301 performs a process of centering the output image (hereinafter, referred to as "image centering process") according to the size of the transfer image.

When the size of the output image is equal to the size of the transfer image (Step S109: N), since the output image and the transfer image have the same size, no centering process is required. In this case, the CPU 301 transfers the output image as it is (Step S111) as shown in FIG. 11A. When the size of the output image is smaller than the size of the transfer image (Step S109: Y), since the transfer image becomes larger than the output image, a centering process is required. In this case, as shown in FIG. 11B, in order to place the output image at the center of the transfer image, the CPU 301 performs image processing (image centering process) by the image processing unit 305 to add a margin around the output image to thereby obtain an image of the same size as the transfer image (Step S110). The CPU 301 transfers image data representing the image after the image centering process to the printer 400 (Step S111). The CPU 401 performs the image forming process based on the image forming start request transmitted from the controller 300 in the process of Step S108 and the image data transferred from the controller 300 in the process of Step S111 (Step S112). As to the copy job, the above processes are performed. As to the copy job for a plurality of originals, the processes Steps S103 to S112 are repeated.

Figure 12A:
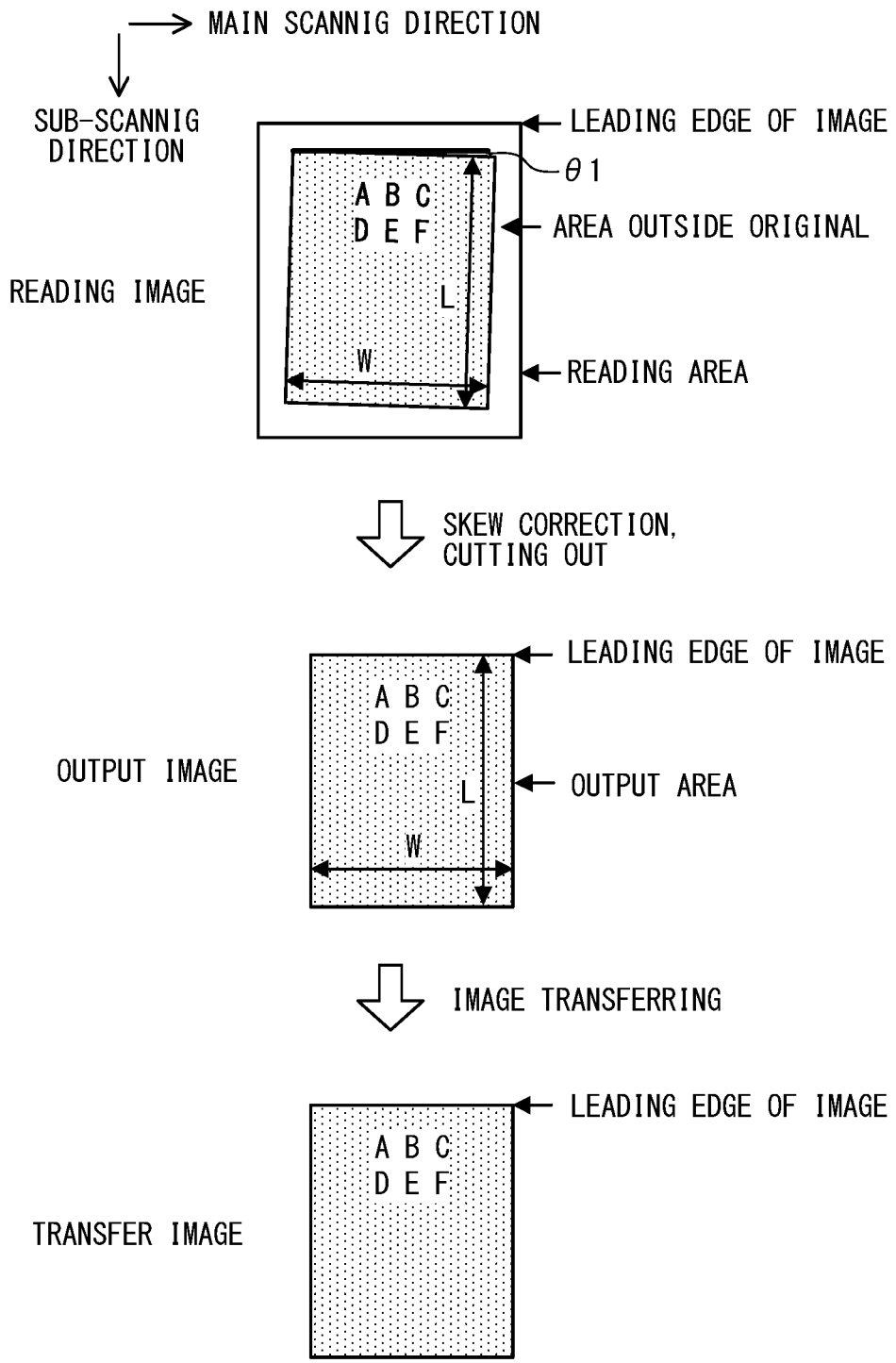
FIG. 12A and FIG. 12B are explanatory diagrams of image states in a scan job.
Figure 12B:
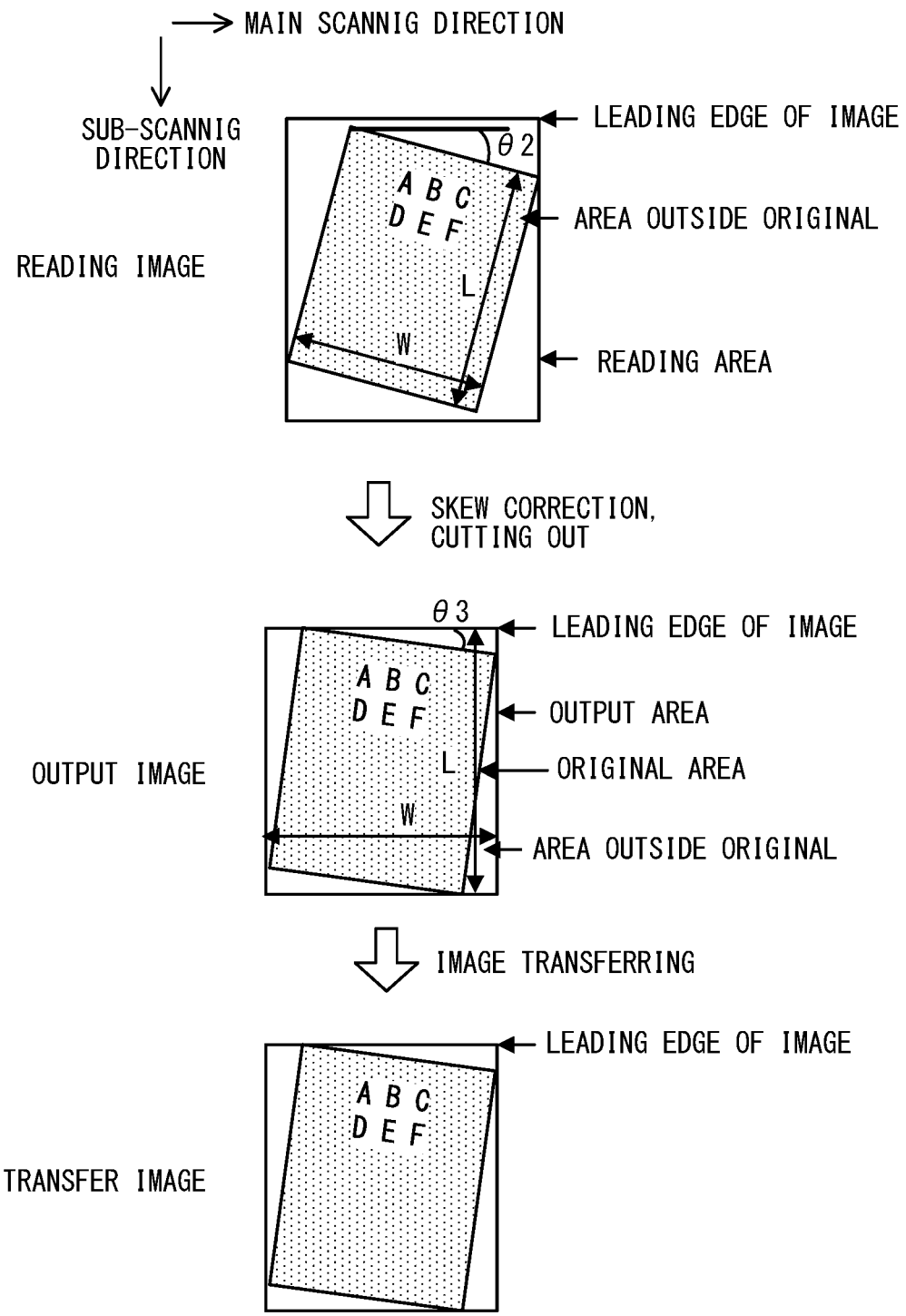

FIGS. 12A and 12B represent the image state at each processing time in the scan job in the case of the flow reading. FIG. 12A shows a state in which the original is skewed by the skew amount θ1. FIG. 12B shows a state in which the original is skewed by the skew amount θ2. As described with reference to FIG. 5, the skew amount θ1 is an angle smaller than the maximum correction angle θMAX. As described with reference to FIG. 7A, the skew amount θ2 is an angle larger than the maximum correction angle θMAX. The reader 200 performs the skew correction and the cutting out of the original on the reading image, and outputs the output image. The controller 300 transmits the image data of the output image obtained from the reader 200 to the external device by the external I/F 307 as the image data of the transmission image.

When the job type is the scan job (Step S105: N), the CPU 301 sets the size of the output image obtained in the process of Step S104 as the size of the image (transmission image) to be transmitted to the external device (Step S120). The CPU 301 transmits the image data of the output image to the external device as it is (Step S121). That is, when the inclination of the image is corrected by the skew correction and the cutting out of the original and the original image is cut out, as shown in FIG. 12A, the transmission image is transmitted in the form of the original image. When the cutting out of the original, including the area outside of the original, is performed with the inclination still remaining after the skew correction and the cutting out of the original as shown in FIG. 12B, the transmission image is sent in a form including the area outside of the original with the inclination remaining. In the case of the scan job, the above processes are performed. In the case of scanning process, a plurality of the originals, the processing of Steps S103, S104, S105, S120, and S121 will be repeated.

Figure 13:
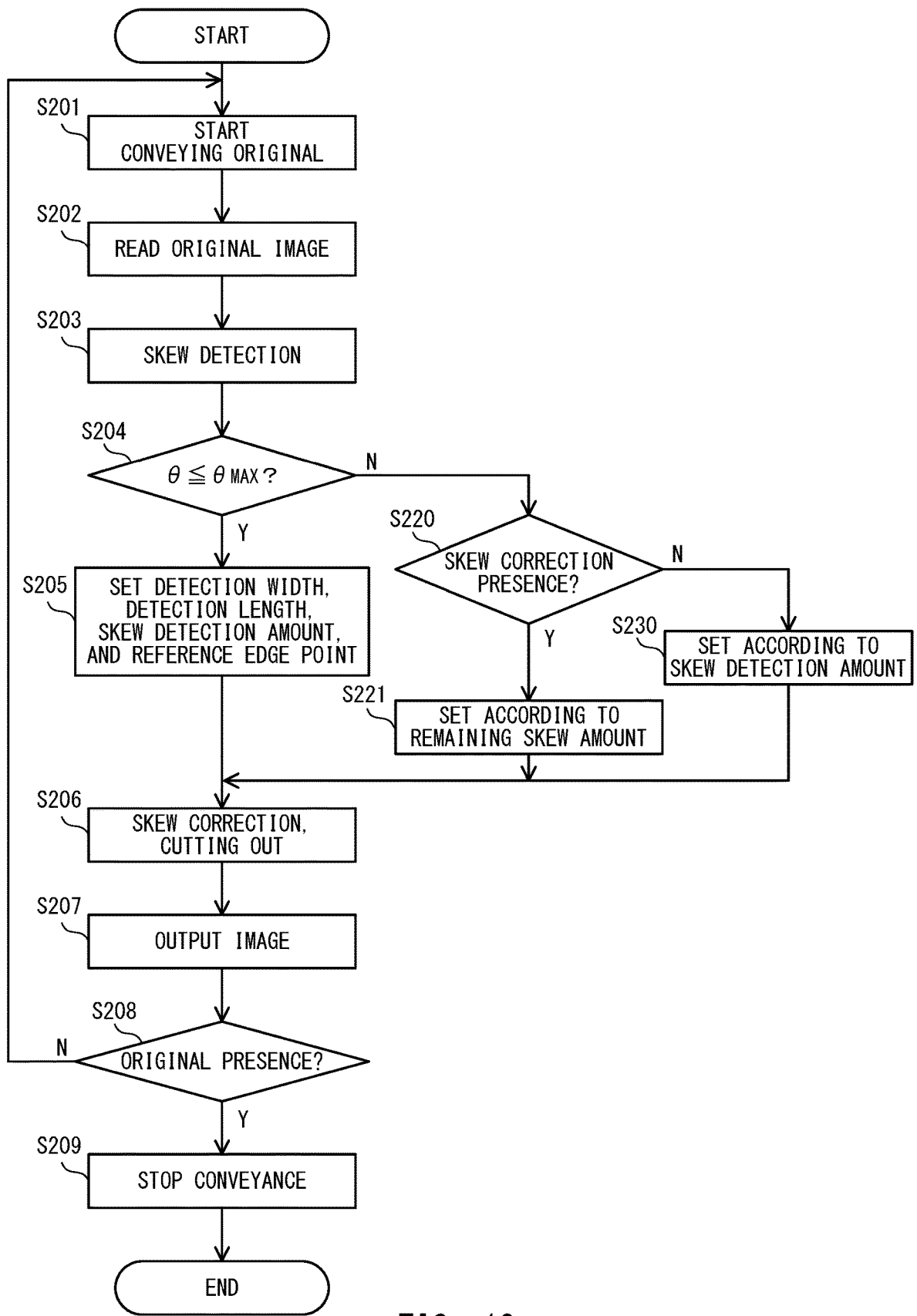
FIG. 13 is a flow chart representing an image reading process.

FIG. 13 is a flowchart representing the image reading process of Step S103 of FIG. 10. The image reading process described here is the flow reading process. This process is started when the CPU 251 obtains the image reading start request from the CPU 301.

When the CPU 251 obtains the image reading start request instructing the flow reading, the CPU 251 starts conveying the original (Step S201). The CPU 251 conveys the original on the uppermost surface of the original bundle S stacked on the feeding tray 30 to the reading position of the reader 200. The CPU 251 reads the original image of the original that passes through the reading position by the reading unit 202 (Step S202). The CPU 251 performs the skew detection by the skew detection unit 271 on the image data of the reading image output from the reading unit 202 (Step S203). The CPU 251 determines the magnitude relationship between the skew amount θ detected by the skew detection and the maximum correction angle θMAX of the skew correction unit 270 (Step S204).

When the skew detection amount θ is equal to or less than the maximum correction angle θMAX (Step S204: Y), as explained with reference to FIG. 5, the CPU 251 sets the output main scanning width, the output sub-scanning length, the skew correction amount θ, and the reference edge point (the rotation reference point) in the skew correction unit 270 (Step S205). The output main scanning width is a leading edge width of the original calculated by the skew detection. The output sub-scanning length is the sub-scanning length L calculated by Formula 1. The skew correction amount is the skew correction amount calculated by the skew detection. The rotation reference point is the coordinates of the reference edge point.

When the skew detection amount θ exceeds the maximum correction angle θMAX (Step S204: N), the CPU 251 confirms, prior to the image reading start request, presence or absence of the skew correction exceeding the maximum correction angle set by the user (Step S220). When performing the skew correction exceeding the maximum correction angle, (Step S220: Y), as explained with reference to FIGS. 7A to 7C, the CPU 251 sets the maximum correction angle θMAX, the rotation reference point, the output sub-scanning length L', and the output main scanning width W' according to the remaining skew amount θ2−θMAX in the skew correction unit 270 (Step S221). The output sub-scanning length L' and the output main scanning width W' corresponding to the remaining skew amount are calculated by Formulas 3-1 and 3-2 with the skew amount θ' as θ'=θ2−θMAX. The rotation reference point is calculated by the above method based on the coordinates of the reference edge point calculated by the skew detection and the remaining skew amount θ2−θMAX after the skew correction.

In a case where the skew correction exceeding the maximum correction angle is not performed (Step S220: N), as explained with reference to FIGS. 8A to 8C, the CPU 251 sets the skew correction amount θ°, the rotation reference point, the output sub-scanning length L', and the output main scanning width W' according to the skew detection amount in the skew correction unit 270 (Step S230). The output sub-scanning length L' and the output main scanning width W' corresponding to the skew detection amount are calculated by Formulas 3-1 and 3-2 with the skew amount θ' as θ'=θ. The rotation reference point is calculated by the above method based on the coordinates of the reference edge point calculated by the skew detection and the remaining skew amount θ2 after the skew correction.

The CPU 251 performs the skew correction and the cutting out of the original by the skew correction unit 270 based on the set value which is set in the skew correction unit 270 in any of the processes of Steps S205, S221, and S230 (Step S206). The CPU 251 outputs the image data representing the output image obtained in the process of S206 to the controller 300 (Step S207). After completing the output, the CPU 251 determines whether the next original is stacked on the feeding tray 30 or not (Step S208). In a case where the original is stacked (Step S208: Y), the CPU 251 repeats the processes after S201. In a case where the last original image has been output and no original is stacked on the feeding tray 30, (Step S208: N), the CPU 251 waits for the completion of the conveyance of the last original and stops the conveyance of the original (Step S209). By the above process, the image reading process by flow reading is completed. In the present embodiment, when the skew amount is larger than θMAX, the image is rotationally corrected by θMAX, however, the present disclosure is not limited to this. For example, in a case where the skew amount is larger than θMAX, the image may be rotationally corrected by an amount smaller than θMAX. That is, in a case where the skew amount is larger than θMAX, the image may be rotationally corrected by a correction amount smaller than θMAX.

Due to the above processes, the image forming apparatus 2000 of the present embodiment prevents, in a case where the reading image is skewed beyond the maximum correction angle, the edge of the original from being missing, in addition, it is possible to reduce the area outside of the original included in the reading image. Therefore, the image forming apparatus 2000 can appropriately output the read original image with a smaller amount of data.

Second Embodiment

In the second embodiment, the configuration of the image forming apparatus 2000, the image reading apparatus 1000, the printer 400, and the control system are the same as the first embodiment. Therefore, the description of these configurations will be omitted. In the second embodiment, an image reading process of the original having a notch or a tab on the leading edge will be described. As to the original with the notch or the tab on its leading edge, the leading edge of the original is not a straight line. The skew amount cannot be detected normally in the original which the leading edge is not a straight line.

Figure 14:
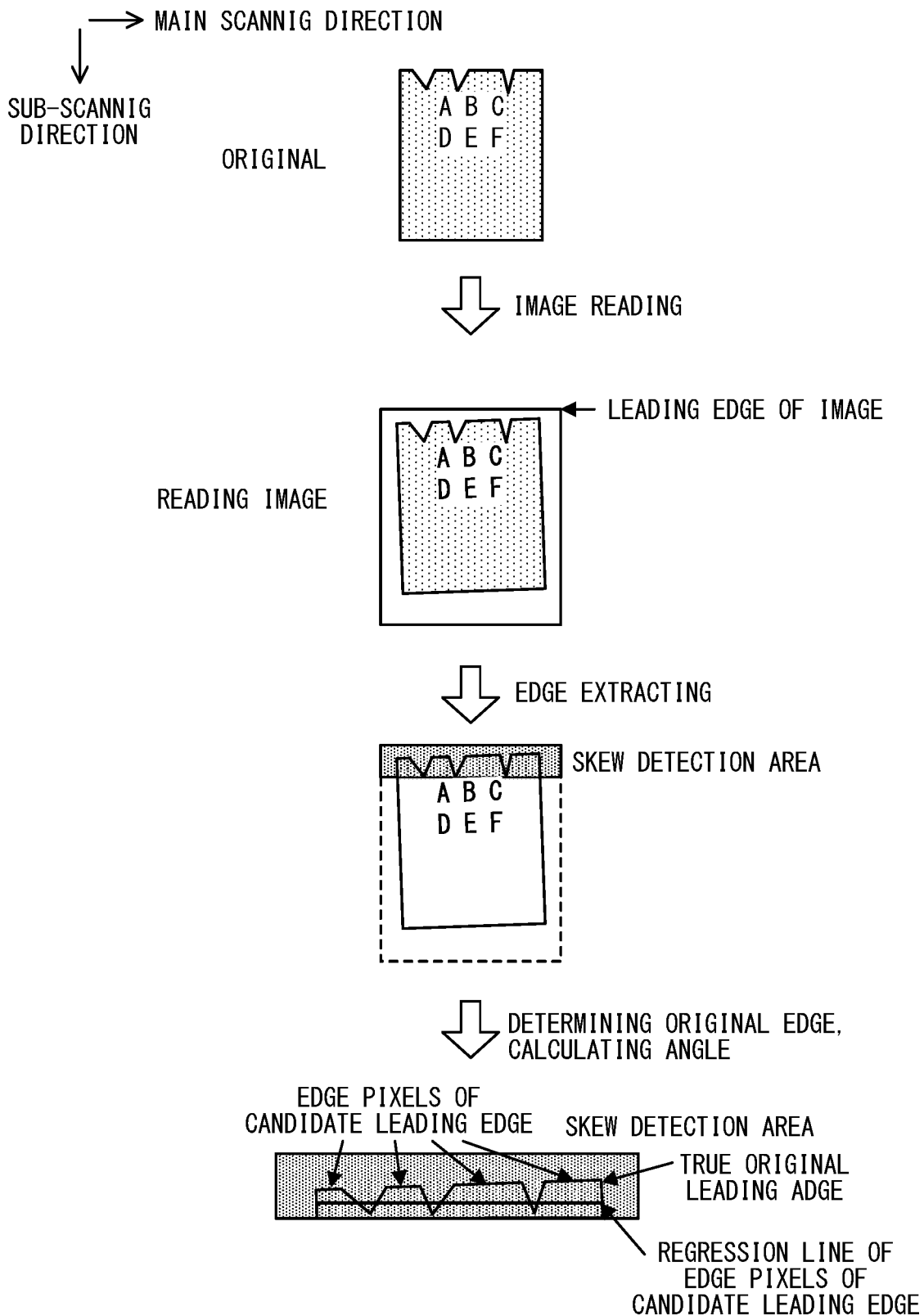
FIG. 14 is an explanatory diagram of the inclination correction of the original having a notch at its leading edge.

FIG. 14 is an explanatory diagram of the inclination correction of the original having the notch in the leading edge. A case where the skew amount (inclination amount) cannot be detected normally will be described with reference to FIG. 14. FIG. 14 represents the reading image in a case where the original image is read by flow reading. The notch at the leading edge of the original occurs in a bound portion of forms which has been bound into a bundle when, for example, they are separated by hand. From the reading image of the original, the edge is extracted within the skew detection area.

As to the original shown in FIG. 14, since there is a notch at the original leading edge, the positions of edge pixels of a candidate leading edge are scattered in the sub-scanning direction. Therefore, a regression line of the edge pixels of a candidate leading edge deviates from a true original leading edge to be detected. That is, the original leading edge is erroneously determined. In a case where the skew amount (inclination amount), the coordinate of the reference edge point, and the width of the original leading edge are calculated based on the erroneously determined original leading edge, the image of the edge of the original may be missing due to the skew correction and the cutting out of the original processing.

In order to prevent missing image at the edge of the original due to the erroneous judgment of the original leading edge, the skew detection unit 271 performs reliability judgment of the regression line of the edge pixels of the candidate leading edge. When it is judged by the reliability judgment that the regression line of the edge pixels of the candidate leading edge is not reliable, the skew detection unit 271 determines that the regression line of the edge pixels of the candidate leading edge deviates from a true leading edge position of the original. In this case, the skew detection unit 271 determines that the skew amount cannot be calculated normally (hereinafter, referred to as "skew detection failure"), and ends the skew detection process. For example, in a case where the covariance of the coordinates of the main scanning direction and the sub-scanning direction of the edge pixels of the candidate leading edge is less than or equal to a predetermined value, the skew detection unit 271 determines that the regression line of the edge pixels of the candidate leading edge is reliable. In a case where the covariance exceeds a predetermined value, the skew detection unit 271 determines that the regression line of the edge pixels of the candidate leading edge is unreliable. In a case where the skew detection is failed, as a result of the skew detection, not only the skew amount but also the coordinates of the reference edge point and the width of the original leading edge cannot be obtained.

Figure 15:
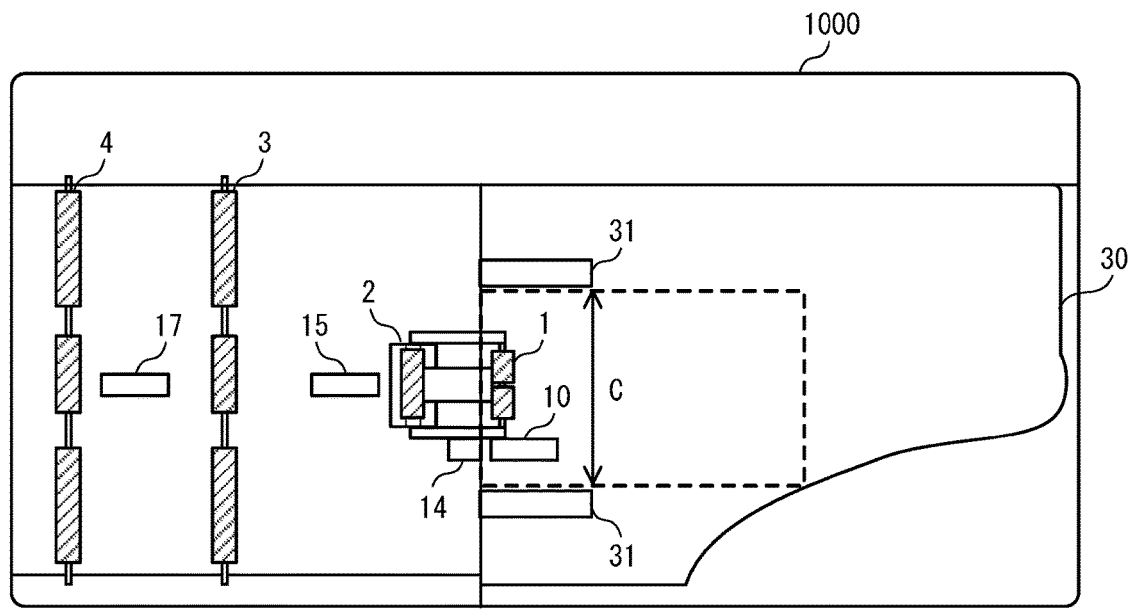
FIG. 15 is a view of the image reading apparatus from above.

FIG. 15 is a view of the image reading apparatus 1000 as viewed from above. The feeding tray 30 is provided with a pair of the original guide plates 31 which regulate the sides of stacked original in the main scanning direction. The edges in the main scanning direction of the original stacked on the feeding tray 30 are aligned with the original guide plate 31. The image reading apparatus 1000 has an original guide width detection sensor 10 that detects a width C between a pair of the original guide plates 31. The CPU 251 detects the width C between the original guide plates 31 by the original guide width detection sensor 10.

When the user places the original on the feeding tray 30 and aligns the original guide plate 31 with the two sides of the main scanning direction of the original, the length of the original in the main scanning direction (original width) is the width C between the original guide plates 31. The CPU 251 can detect the original width based on the width C between the original guide plates 31 (hereinafter, the width C between the original guide plates 31 is referred to as "tray width"). In a case where the skew detection fails, the original leading edge width, which is to be obtained by the skew detection, cannot be obtained. Therefore, the cutting out of the original is performed based on the tray width using the method described later.

Even in a case of the original placed normally (straight) on the feeding tray 30, due to the assembly accuracy of the reading unit 202 and ADF100, a manufacturing error of each roller used for conveying the original, etc., the original image in the reading image may be inclined. The maximum value of the skew amount that can occur by design in the original placed normally on the feeding tray 30 is defined as "expected maximum skew amount θi". In the present embodiment, in a case where the skew detection fails, the cutting out of the original is performed to prevent missing image at the edge of the original even if the expected maximum skew amount θi occurs. In the image reading apparatus 1000 of the present embodiment, the expected maximum skew amount θi is defined to be 3.5°.

Since the expected maximum skew amount θi is defined based on the premise that the original is normally placed on the feeding tray 30, in a case where the original is placed on the feeding tray 30 in a tilted or inclined state, the possibility of image omission at the edge of the original increases. When preventing the image omission at the edge of the original considering the above situation, the expected maximum skew amount θi may be added to the feeding tray, for example, an allowable inclination amount at the time of stacking the original on the feeding tray 30 may be added to the expected maximum skew amount θi.

Further, depending on a position of the center of rotation when the original is skewed, the arrangement of the main scanning direction and the sub-scanning direction of the original image in the reading image differs. In the image reading apparatus 1000 of the present embodiment, among the expected maximum skew amount θi, skewing that occurs in the process of paper feeding and separation by the sheet feeding roller 1 and separation roller 2 is dominant. As shown in FIG. 15, the sheet feeding roller 1 and the separation roller 2 are arranged in the center of the main scanning direction along the sheet conveyance path of the ADF 100. Therefore, in the present embodiment, it is assumed that the expected maximum skew amount θi occurs with the center of the main scanning direction of the original leading edge being the center of rotation. Also in this case, as the actual center of rotation deviates from the center of the main scanning direction of the original leading edge, the possibility of image omission at the edge of the original increases. When preventing the image omission at the edge of the original considering the above situation, a predetermined margin is added while calculating the output main scanning width and the output sub-scanning length described later.

Figure 16A:
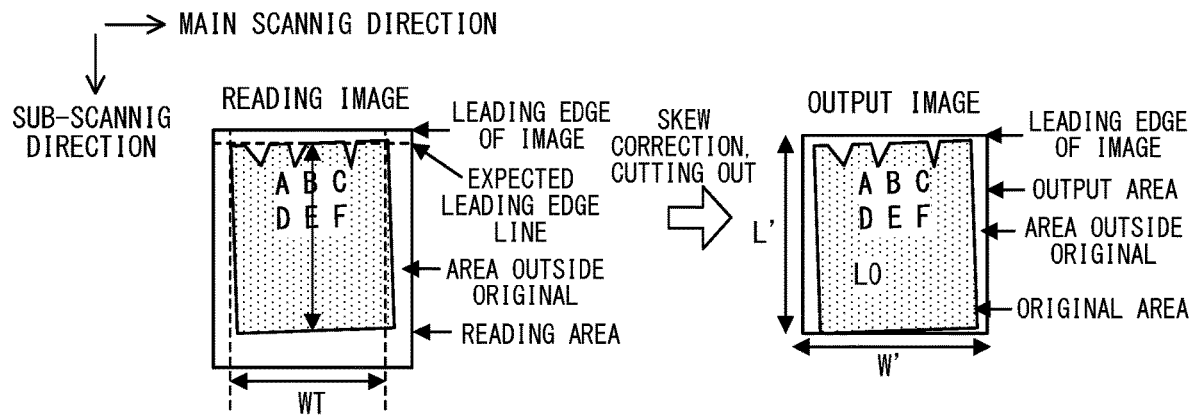
FIG. 16A, FIG. 16B, FIG. 16C, FIG. 16D, and FIG. 16E are explanatory diagrams of trimming of the original when a skew detection fails.

FIGS. 16A to 16E are explanatory diagrams of the cutting out of the original in a case where the skew detection fails. FIG. 16A shows an image state until the output image is obtained from the reading image of the original in a case where the skew detection fails. In a case where the skew detection fails and the original leading edge cannot be determined, based on the timing when the original detection sensor 18 detects the original leading edge and the distance between the detection position and the reading position of the original detection sensor 18, the skew detection unit 271 determines a virtual original leading edge position (hereinafter, referred to as "expected leading edge line").

Further, as described above, the skew detection unit 271 determines the original length L0 along the conveyance path from the timing when the original detection sensor 18 detects the original leading edge and the timing when the trailing edge of the original is detected. The skew detection unit 271 determines the tray width WT (actual width of the original) from the width C between the original guide plates 31 when the original is placed on the feeding tray 30.

Figure 16B:
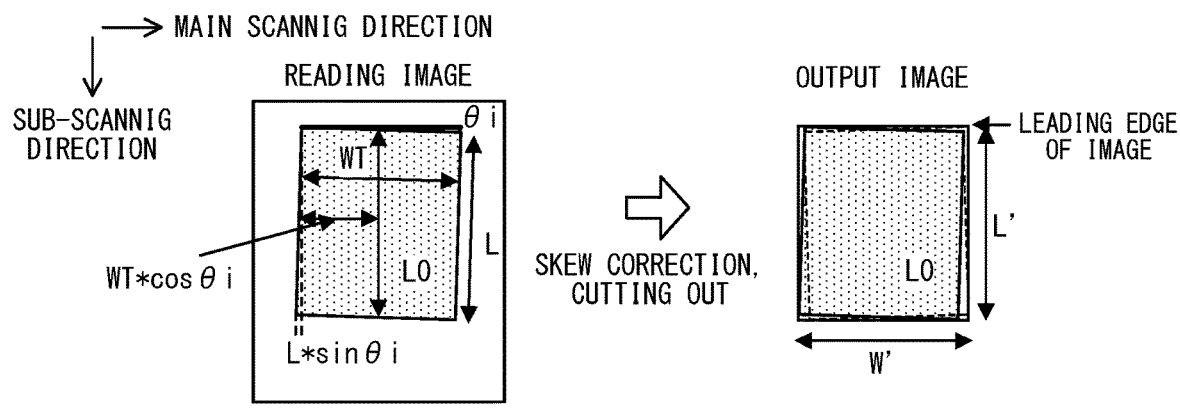
Figure 16C:
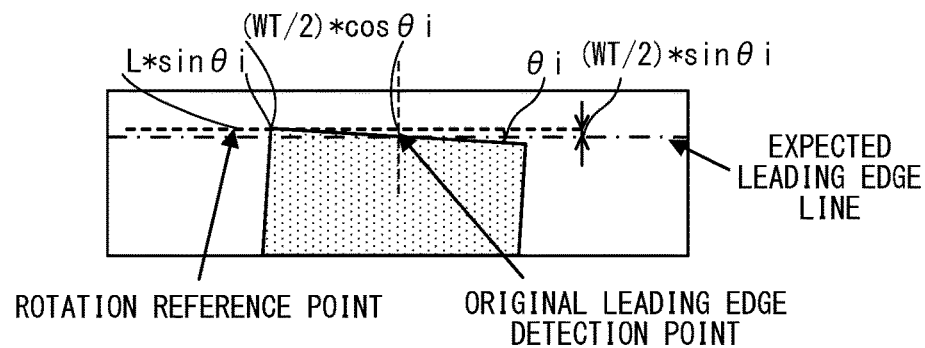
Figure 16D:
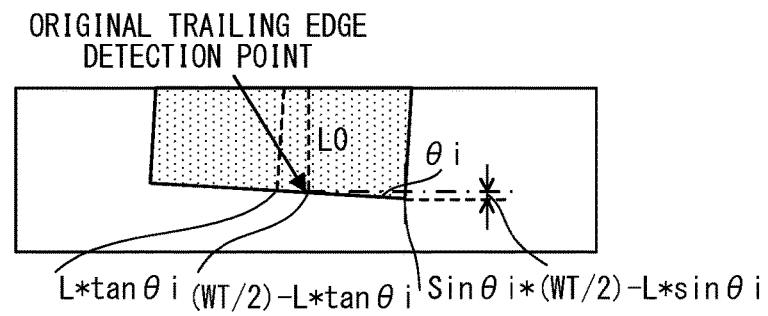
Figure 16E:
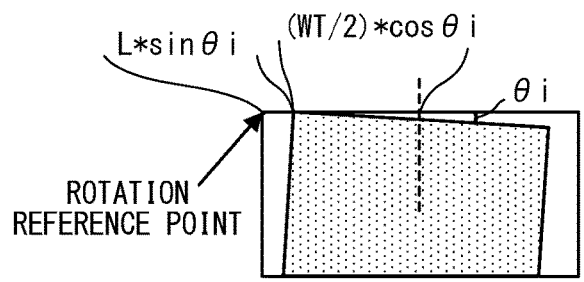

FIG. 16B is an explanatory diagram of the cutting out of the original when the original is skewed by the expected maximum skew amount θi. After preventing the image omission at the edge of the original for the reading image, the cutting out of the original is performed such that the area outside of the original included in the output image is reduced. FIG. 16C is an enlarged view of the leading edge portion of the reading image of FIG. 16B. FIG. 16D is an enlarged view of the trailing edge portion of the reading image of FIG. 16B. FIG. 16E is an enlarged view of the leading edge portion of the output image of FIG. 16B.

As shown in FIG. 16C, the width from the center of the reading image to the upper left vertex of the original image is $(WT/2)*\cos\theta i$. Further, the length from the upper left vertex to the lower left vertex of the original image is $L*\sin\theta i$ with respect to the original length L. The original length L is $L=L0*\cos\theta i$, from the above Formula 1. When the original is skewed upward to right by the expected maximum skew amount θi (dotted line in the output image of FIG. 16B), the width from the center of the reading image in the main scanning direction to the upper right apex of the original image can be obtained from the formulas described above. Similarly, the width from the upper right vertex to the lower right vertex of the original image can be obtained from the formulas described above. Thus, the output main scanning width W' of the output image by the cutting out of the original shown in FIG. 16B is obtained by the following Formula 4.

$$W' = (L \sin\theta i + (WT \cos\theta i)/2)*2 = 2L0 \sin\theta i \cos\theta i + WT \cos\theta i \quad \text{(Formula 4)}$$

As shown in FIG. 16C, the length from the expected leading edge line to the upper right vertex of the original image is $(WT/2)*\sin\theta i$. Further, as shown in FIG. 16D, the length of the side of the original image trailing edge from the center position in the main scanning direction of the original trailing edge to the detection position of the original trailing edge by the original detection sensor 18 is $L*\tan\theta i$. Further, the length of the side of the original image trailing edge from the detection position of the original trailing edge to the lower right vertex of the original image by the original detection sensor 18 is $(WT/2)-L*\tan\theta i$. Thus, the length of the side of the original image trailing edge from the detection position of the original trailing edge by the original detection sensor 18 to the lower right vertex of the original image is $\sin\theta i*((WT/2)-L*\tan\theta i)$. From the above, the output sub-scanning length L' in the output image of FIG. 16B is obtained by the following Formula 5.

$$L' = (WT/2)*\sin\theta i + L0 + \sin\theta i*((WT/2) - L*\tan\theta i) \quad \text{(Formula 5)}$$
$$= L0\cos^2\theta i + WT\sin\theta i$$

The CPU 251 sets the output sub-scanning length L' and the output main scanning width W' calculated by Formulas 4 and 5 in the skew correction unit 270. Further, the CPU 251 sets the skew correction amount 0° (without skew correction) to the skew correction unit 270. Further, the CPU 251 obtains the rotation reference point as follows and sets it in the skew correction unit 270. As shown in FIG. 16C, the upper left vertex of the original image is a point $(WT/2)*\sin\theta i$ upward and $(WT/2*\cos\theta i)$ to the left from the center of the main scanning direction of the expected leading edge line. The point $(L*\sin\theta i)$ to the left from the upper left vertex is the rotation reference point.

The skew correction and the cutting out of the original are performed based on the output main scanning width W', the output sub-scanning length L', the skew correction amount 0°, and the rotation reference point. As a result, as shown in FIG. 16B, when the original is skewed by the expected maximum skew amount θi, the area outside of the original included in the output image is minimized while preventing the occurrence of the missing area in the image of the output image. By performing the skew correction and the cutting out of the original on the reading image of FIG. 16A in this way, the output image shown in FIG. 16A can be obtained.

Figure 17:
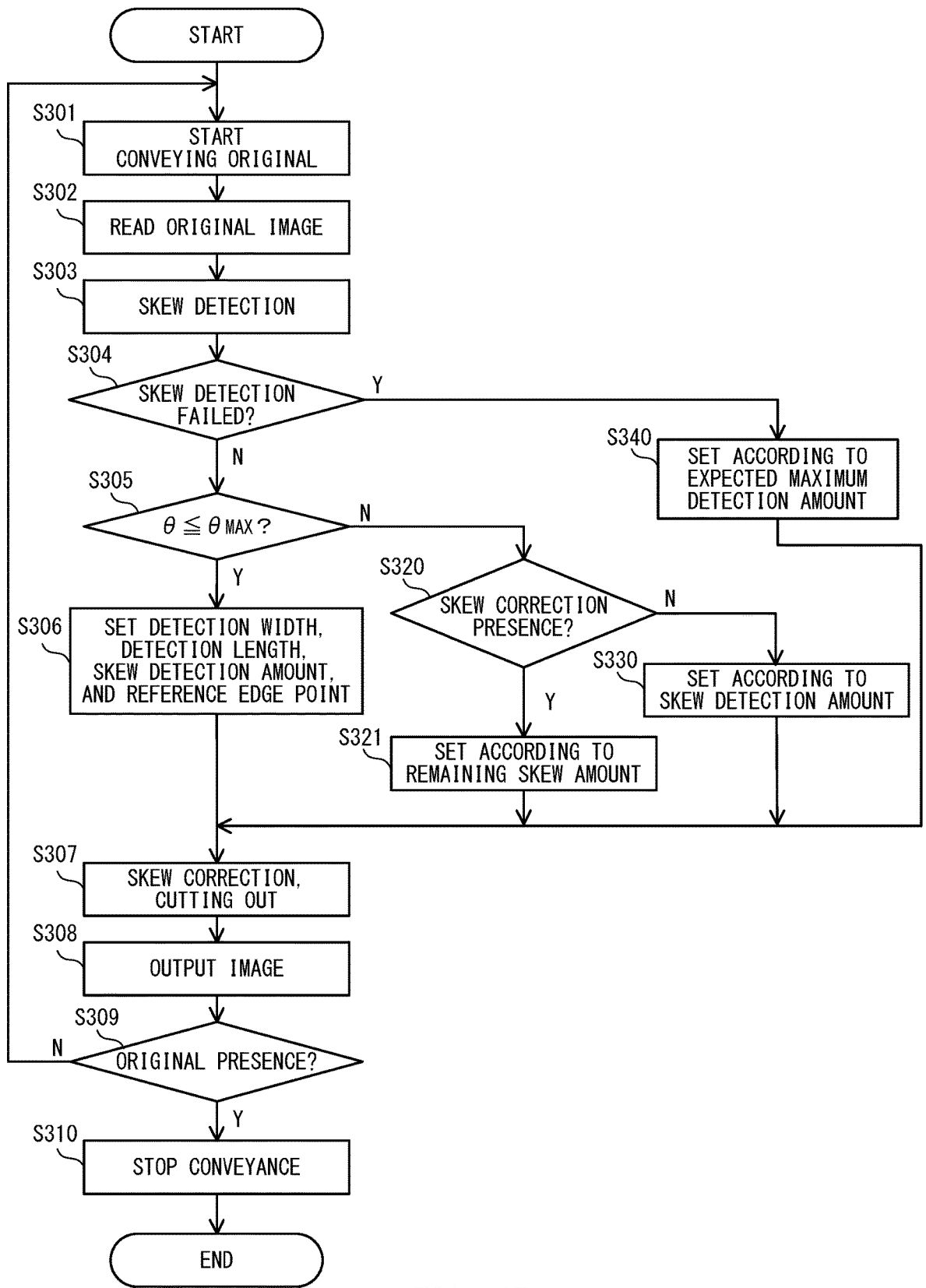
FIG. 17 is a flow chart representing the image reading process.

FIG. 17 is a flowchart representing the image reading process of Step S103 of FIG. 10 according to the second embodiment. The image reading process described here is the flow reading process. This process is started when the CPU 251 obtains the image reading start request from the CPU 301.

Since the processes of Steps S301 to S303 are the same as the processes of Steps S201 to S203 of FIG. 13, the description thereof will be omitted. The CPU 251 determines whether or not the skew detection by the process of Step S303 has failed or not (Step S304). Whether the skew detection is failed or not is determined by whether the skew amount, the coordinates of the reference edge point, and the width of the original leading edge are obtained by the process of the skew detection or not. If at least one of them is not obtained, it is determined that the skew detection has failed.

In a case where the skew detection failed (Step S304: Y), the CPU 251 sets the skew correction unit 270 to a value corresponding to the expected maximum detection amount (Step S340). Specifically, the CPU 251 sets the output sub-scanning length L' and the output main scanning width W' calculated by the Formulas 4 and 5 in the skew correction unit 270. The CPU 251 sets the skew correction amount 0° in the skew correction unit 270. The CPU 251 calculates the rotation reference point by the above-mentioned method described with reference to FIG. 16C and sets it in the skew correction unit 270. The CPU 251 performs skew correction and the cutting out of the original by the skew correction unit 270 based on the set value set in the skew correction unit 270 in the process of Step S340 (Step S306).

When the skew detection is successful (Step S304: N), the CPU 251 performs the image reading process by the same processing as in Steps S204 to S209, S220, S221, and S230 of FIG. 13 (Steps S305 to S310, S320, S321, S330). In this way, the image reading process by flow reading is completed.

As described above, in the image forming apparatus 2000 of the present embodiment, even in a case where the skew amount cannot be obtained normally from the reading image and the skew of the expected maximum skew amount has occurred, it is possible to prevent the image omission at the edge of the original and reduce the area outside of the original included in the reading image. Therefore, the image forming apparatus 2000 can appropriately output the read original image with a smaller amount of data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-212652, filed Dec. 22, 2020, which is hereby incorporated by reference herein in its entirety.

What is claimed is:

1. An image reading apparatus, comprising:
a conveyor configured to convey an original in a conveyance direction;
a reader configured to read an image of the original conveyed by the conveyor; and
at least one processor configured to:
determine, based on the image read by the reader, an inclination amount corresponding to an inclination angle of a side of a leading edge of the original in the conveyance direction, wherein the inclination angle represents an inclination of the side of the leading edge of the original with respect to a width direction orthogonal to the conveyance direction;
rotationally correct the image read by the reader by the inclination amount so as to reduce the inclination amount to output a first image in which the rotationally corrected image is included in a case where the inclination amount is smaller than a predetermined amount, wherein the size of the first image is a smallest size among standard sizes in which the rotationally corrected image is included; and rotationally correct the image read by the reader by the predetermined amount so as to reduce the inclination amount to output a second image in which the rotationally corrected image is included in a case where the inclination amount is larger than a predetermined amount, wherein the size of the second image is smaller than a minimum size among standard sizes in which the rotationally corrected image is included and larger or equal to a size of a rectangle circumscribing the rotationally corrected image.

2. The image reading apparatus according to claim 1, wherein the at least one processor is configured to calculate the inclination amount based on an angle formed by a direction corresponding to the image which corresponds to the side of the leading edge of the image read by the reader and a direction corresponding to the width direction.

3. The image reading apparatus according to claim 1, wherein the predetermined amount is a maximum inclination amount which can be corrected by the at least one processor.

4. An image reading apparatus, comprising:

a conveyor configured to convey an original in a conveyance direction;

a reader configured to read an image of the original conveyed by the conveyor; and at least one processor configured to:

determine, based on the image read by the reader, an inclination amount corresponding to an inclination angle of a side of a leading edge of the original in the conveyance direction, wherein the inclination angle represents an inclination of the side of the leading edge of the original with respect to a width direction orthogonal to the conveyance direction;

rotationally correct the image read by the reader by the inclination amount so as to reduce the inclination amount to output a first image in which the rotationally corrected image is included in a case where the inclination amount is smaller than a predetermined amount, wherein the size of the first image is a smallest size among standard sizes in which the rotationally corrected image is included; and rotationally correct the image read by the reader by a first amount so as to reduce the inclination amount to output a second image in which the rotationally corrected image is included in a case where the inclination amount is larger than a predetermined amount, wherein the size of the second image is smaller than a minimum size among standard sizes in which the rotationally corrected image is included and larger or equal to a size of a rectangle circumscribing the rotationally corrected image, and wherein the first amount is smaller than the predetermined amount.

5. The image reading apparatus according to claim 4, wherein the first amount is larger than the inclination amount.

6. An image reading apparatus, comprising:

a conveyor configured to convey an original in a conveyance direction;

a reader configured to read an image of the original conveyed by the conveyor; and at least one processor configured to:

determine, based on the image read by the reader, an inclination amount corresponding to an inclination angle of a side of a leading edge of the original in the conveyance direction, wherein the inclination angle represents an inclination of the side of the leading edge of the original with respect to a width direction orthogonal to the conveyance direction;

rotationally correct the image read by the reader by the inclination amount so as to reduce the inclination amount to output a first image in which the rotationally corrected image is included in a case where the inclination amount is smaller than a predetermined amount, wherein the size of the first image is a smallest size among standard sizes in which the rotationally corrected image is included; and output, without rotationally correcting the image read by the reader, a second image in which the image read by the reader is included in a case where the inclination amount is larger than the predetermined amount, wherein the size of the second image is smaller than a minimum size among standard sizes in which the image which is not rotationally corrected is included and is larger or equal to a size of a rectangle circumscribing the image which is not rotationally corrected.

* * * * *